(12) United States Patent
Thaler et al.

(10) Patent No.: US 6,378,461 B1
(45) Date of Patent: Apr. 30, 2002

(54) SELF-CLEANING LITTER BOX

(75) Inventors: Arnold Thaler, Miami Lakes, FL (US); Philip Y. H. Cheung, Kowloon (HK)

(73) Assignee: HP Intellectual Corp., Wilmington, DE (US)

( * ) Notice: Subject to any disclaimer, the term of this patent is extended or adjusted under 35 U.S.C. 154(b) by 0 days.

(21) Appl. No.: 09/552,359

(22) Filed: Apr. 19, 2000

(51) Int. Cl.$^7$ ............................................. A01K 29/00
(52) U.S. Cl. ..................................................... 119/166
(58) Field of Search ................................. 119/162, 163, 119/164, 165, 166, 168

(56) References Cited

U.S. PATENT DOCUMENTS

| | | | |
|---|---|---|---|
| 3,734,057 A | 5/1973 | Lee et al. | |
| 3,811,410 A | 5/1974 | Roberts | |
| 4,011,836 A | 3/1977 | Temel | |
| 4,011,837 A | 3/1977 | Ksioszk | |
| 4,096,827 A | 6/1978 | Cotter | |
| 4,098,229 A | 7/1978 | Haynes et al. | |
| 4,117,804 A | 10/1978 | Moore | |
| 4,190,525 A | 2/1980 | Menzel | |
| 4,325,325 A | 4/1982 | Larter | |
| 4,325,822 A | 4/1982 | Miller | |
| 4,574,735 A | 3/1986 | Hohenstein | |
| 4,658,720 A | 4/1987 | Massonnet | |
| 4,729,342 A | 3/1988 | Loctin | |
| 4,846,104 A | 7/1989 | Pierson, Jr. | |
| 4,854,267 A | 8/1989 | Morrow | |
| 4,934,317 A | 6/1990 | Pourshalchi | |
| 4,949,673 A | 8/1990 | Yamamoto | |
| 5,012,765 A | * 5/1991 | Naso et al. ................. | 119/166 |
| 5,048,463 A | 9/1991 | Wilson et al. | |
| 5,048,465 A | 9/1991 | Carlisi | |
| 5,107,797 A | 4/1992 | LaRoche | |
| 5,168,834 A | * 12/1992 | Buschur ..................... | 199/166 |
| 5,184,575 A | 2/1993 | Reinartz | |
| 5,188,062 A | 2/1993 | Joy et al. | |
| 5,226,388 A | 7/1993 | McDaniel | |
| 5,249,549 A | 10/1993 | Rockaitis, III | |
| 5,272,999 A | * 12/1993 | Nussle ....................... | 119/166 |
| 5,279,258 A | 1/1994 | Kakuta | |
| 5,460,122 A | 10/1995 | Reinartz | |
| 5,477,812 A | 12/1995 | Waters | |
| 5,511,513 A | 4/1996 | Baron et al. | |
| 5,544,620 A | 8/1996 | Sarkissian | |
| 5,564,364 A | 10/1996 | Kovacs et al. | |
| 5,592,900 A | 1/1997 | Kakuta | |
| 5,727,691 A | * 3/1998 | Vittrup ....................... | 119/168 |
| 5,799,610 A | * 9/1998 | Poulos ........................ | 119/166 |
| 5,806,461 A | * 9/1998 | Kiera .......................... | 119/165 |

FOREIGN PATENT DOCUMENTS

| | | |
|---|---|---|
| DE | 297 18 260 U1 | 10/1997 |
| EP | 0 154 540 | 4/1985 |
| EP | 0 297 015 | 4/1988 |
| EP | 0 972 442 A1 | 10/1999 |

* cited by examiner

*Primary Examiner*—Thomas Price
(74) *Attorney, Agent, or Firm*—Barry E. Deutsch

(57) ABSTRACT

A self-cleaning litter box for cats employs a comb drive to drive a comb through litter to remove waste from the litter. A sensor for detecting the presence of an obstruction is coupled to the comb drive and stops the comb drive upon detecting an obstruction. A manual mode selector switch and an actuating switch are provided to manually activate the cleaning of the litter box at a time deemed appropriate by the cat owner. A foot pedal unit may be provided for semi-automatic use. A removable tray for cat litter may be provided. The tray may be disposable. A pivotable ramp facilitates ingress to, and egress from, the litter box. The ramp may be carpeted. A tray receives the litter box and a hood encloses the litter box to provide privacy.

7 Claims, 18 Drawing Sheets

SELF-CLEANING LITTER BOX

The present invention is directed to litter boxes and particularly to self-cleaning litter boxes for cats.

BACKGROUND

Cats are usually trained to use a litter box for elimination of both liquid and solid wastes. A cat litter box is normally made of plastic or like material so that a cat's urine will not leak through the box. Other cat litter boxes have been proposed, as in the construction described in U.S. Pat. No. 5,249,549 (Rockaitis), in which the litter box is made of a material that absorbs liquid but does not permit it to leach through to the exterior of the box. The litter used in boxes of this kind may be one of any number of particulate litter or other materials that absorb moisture from the waste of the cat. The material may also suppress odor from cat waste. Some forms of cat litter form clumps when wet. Usually, a cat will bury its solid waste in the litter material in the box.

Most cat owners take appropriate action to discard the litter from a cat litter box after an appreciable period of time, often several days. On the other hand, even before the litter has been thoroughly saturated with waste from the cat or cats that use it, a cat may be inclined to push some of the litter out of the box, particularly if the odor is strong. In any event, the person using a cat litter box may find the task of emptying the cat litter to be unpleasant. Thus, a number of devices have been proposed for cleaning cat litter boxes. Such devices are disclosed in U.S. Pat. No. 4,096,827 (Cotter), U.S. Pat. No. 4,117,804 (Moore et al.), U.S. Pat. No. 4,190,525 (Menzel), U.S. Pat. No. 4,325,325 (Larter), U.S. Pat. No. 4,325,822 (Miller), U.S. Pat. No. 5,048,465 (Carlisi), U.S. Pat. No. 5,226,388 (McDaniel), and U.S. Pat. No. 5,477,812 (Waters).

The self-cleaning cat litter box disclosed in the Carlisi patent utilizes a rake or comb that is normally maintained in a storage position at one end of the litter chamber. At predetermined intervals, the comb is moved through the litter, from the rake storage end of the chamber to the opposite end, which constitutes a discharge end for the chamber. At the discharge end of the chamber the rake moves up out of the litter and discharges any clumps collected by the comb into a disposal receptacle. Unfortunately, because cats are not consistent in their elimination habits, such periodic clearing may be too frequent, or not frequent enough.

The Waters patent describes a system for moving a comb or rake through the litter responsive to entry and exit of the cat from the litter box. In addition, Waters provides an improved disposal receptacle and alarms to report an insufficient litter supply and a full disposal receptacle. The entire disclosure of the Waters '812 patent is incorporated herein by reference.

Despite the advances made by these prior art patents, there remains several deficiencies in self-cleaning litter boxes. First, if the cat is present in the litter box while the rake or comb is moving, the cat may be startled to move suddenly and spill the contents of the litter box or, the cat could be caught by the mechanism. Second, devices that require the passage of time or the activity of a cat to initiate the rake drive mechanism do not allow for use of the rake at other times. Third, easy access is needed to aid cats in entering and exiting the litter box. The open boxes allow litter to be spilled out and do not provide cover for cats that may desire privacy.

SUMMARY

The present invention alleviates to a great extent the deficiencies of the prior art by providing a litter box having a housing defining an upwardly open litter chamber for receiving cat litter, a comb disposed in the litter chamber, a carriage supporting the comb, and a comb drive for driving the comb between a storage position and a discharge position. The comb drive includes a reversible drive motor mounted on the carriage. A reverse sensor is coupled to the carriage. The reverse sensor is coupled to a first surface of the carriage and the sensor provides a shut-off signal to the comb drive when the sensor detects that the carriage has contacted a cat, or other obstruction, while moving between the storage position and the discharge position. According to one aspect of the invention, the reverse sensor includes a switch electronically coupled to the drive motor for providing the shut-off signal to the comb drive in the closed position. In one embodiment of the invention, the reverse sensor is a leaf switch.

In another aspect of the invention, the litter box has a mode selector switch. The switch may have a manual operation selecting position and an automatic operation selecting position. In addition, a manual operation switch may be electrically connected to the mode selector switch. According to another aspect of the invention, the comb drive drives the comb between a storage position and a discharge position in response to actuation of the manual operation switch when the mode selector switch is in the manual operation selecting position.

In yet another embodiment of the invention, a rectangular tray has side walls and a bottom wall that cooperate to define a housing-receiving region. Hood supports are coupled to the rectangular tray. A hood is coupled to the supports. The hood includes an opening for a cat to enter or exit the litter box. According to another aspect of the invention, a housing access ramp is pivotally connected to the housing, preferably at the opening.

In still another embodiment of the invention, the litter chamber includes a removable litter tray for receiving the cat litter.

The present invention may also be provided with means for ensuring that the comb stops when it strikes a cat while moving between the storage and discharge positions. By stopping the comb, the situation in which a cat is pinned between the comb and a wall is prevented.

The invention provides a manual cleaning mode that allows the cat owner to initiate the waste removal upon the activation of a switch. This mechanism would allow the cat owner to clean the waste out of the litter box at a time deemed appropriate by the cat owner.

The invention also provides an enclosure for a self-cleaning litter box to provide privacy for the cat. The enclosure could also be used to prevent litter from being spilled out of the box.

Other features and advantages of the present invention will be readily apparent from the following description and drawings which illustrate preferred embodiments of the invention.

DESCRIPTION OF PREFERRED EMBODIMENTS

Figure 1:
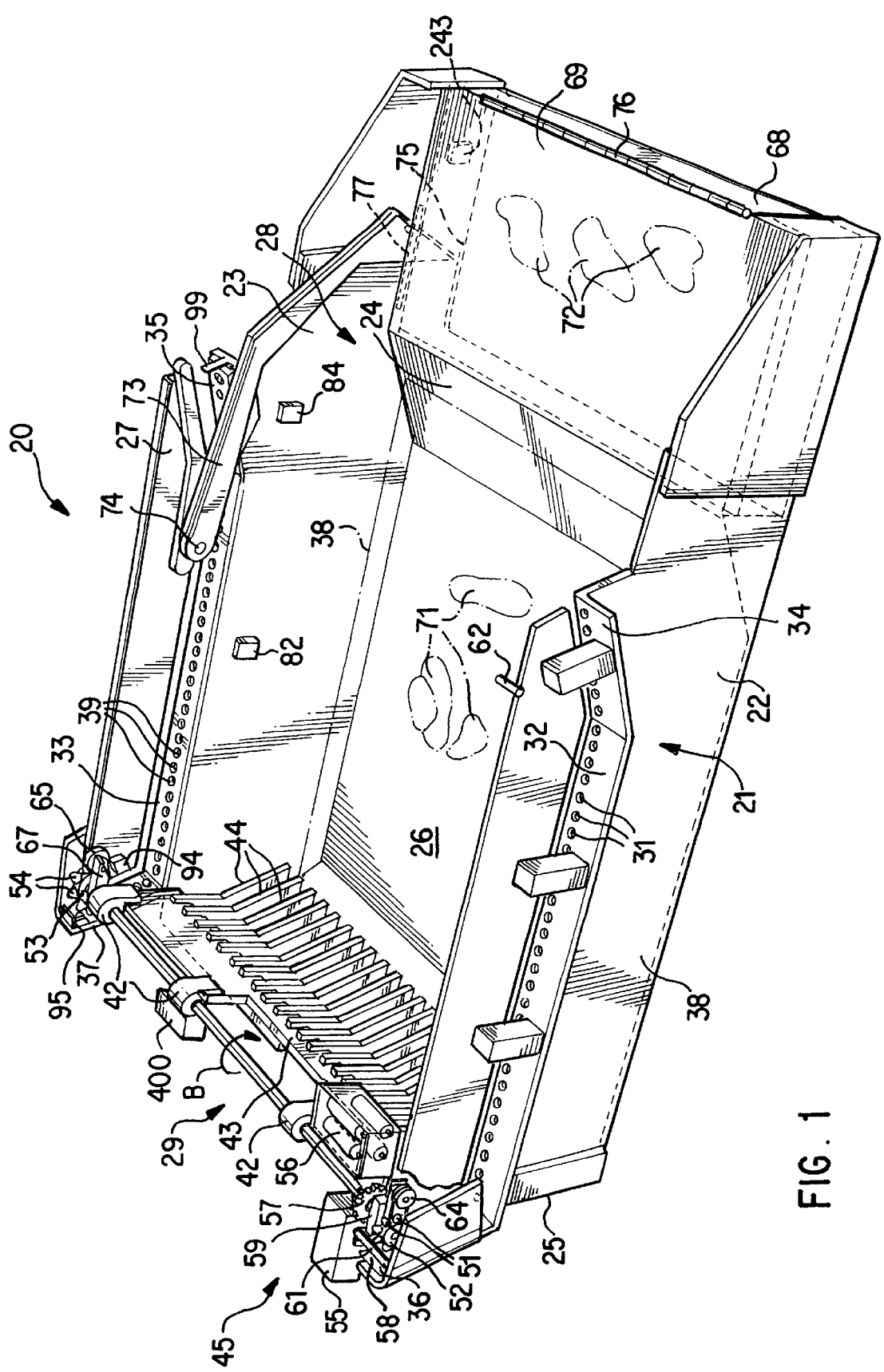
FIG. 1 is a perspective view of an automated self-cleaning litter box for use by a cat, constructed in accordance with a preferred embodiment of the invention, showing the litter box in a waiting condition with the comb at the storage position. The dress panels have been removed for clarity to expose the internal structure.

FIGS. 1–4 illustrate a self-cleaning litter box 20 that includes a comb 43 that rakes clumps of litter 71 into a waste receptacle 68. The comb 43 moves from a storage position, shown in FIG. 1 to a discharge position, shown in FIG. 3. As the comb 43 approaches the discharge position, the lid 69 of the waste receptacle 68 opens to allow clumps of litter 71 to enter the receptacle. After dumping the clumps of litter 71 into the receptacle 71, the comb 43 automatically reverses direction to return to the storage position. A sensor 400, shown schematically in FIGS. 1–4, detects the presence of a cat or other obstruction, and automatically stops the comb and reverses its direction of travel.

FIGS. 1–4 illustrate a litter box 20 having a pan-shaped housing 21. The housing 21 has a near side wall 22, a far side wall 23, and a discharge end wall 24 joining the sidewalls 22, 23 at one end of the litter box 20. The litter box 20 also has a comb storage end wall 25 connecting the sidewalls 22, 23 at the other end of the litter box 20. The bottom of the litter box 20 is identified by reference numeral 26. The fill level to which the box 20 is usually filled with cat litter is shown by litter level line 38 (dashed line). The litter level line 38 may be afforded by a continuous or interrupted ridge in the interior of the housing 21. Thus, the litter box 20 has a discharge end 28 at one end and a comb storage end 29 at the opposite end. The sidewalls 22, 23, end walls 24, 25 and bottom 26 to the box 20 are preferably formed in a molding operation that produces the complete housing 21.

Figure 2:
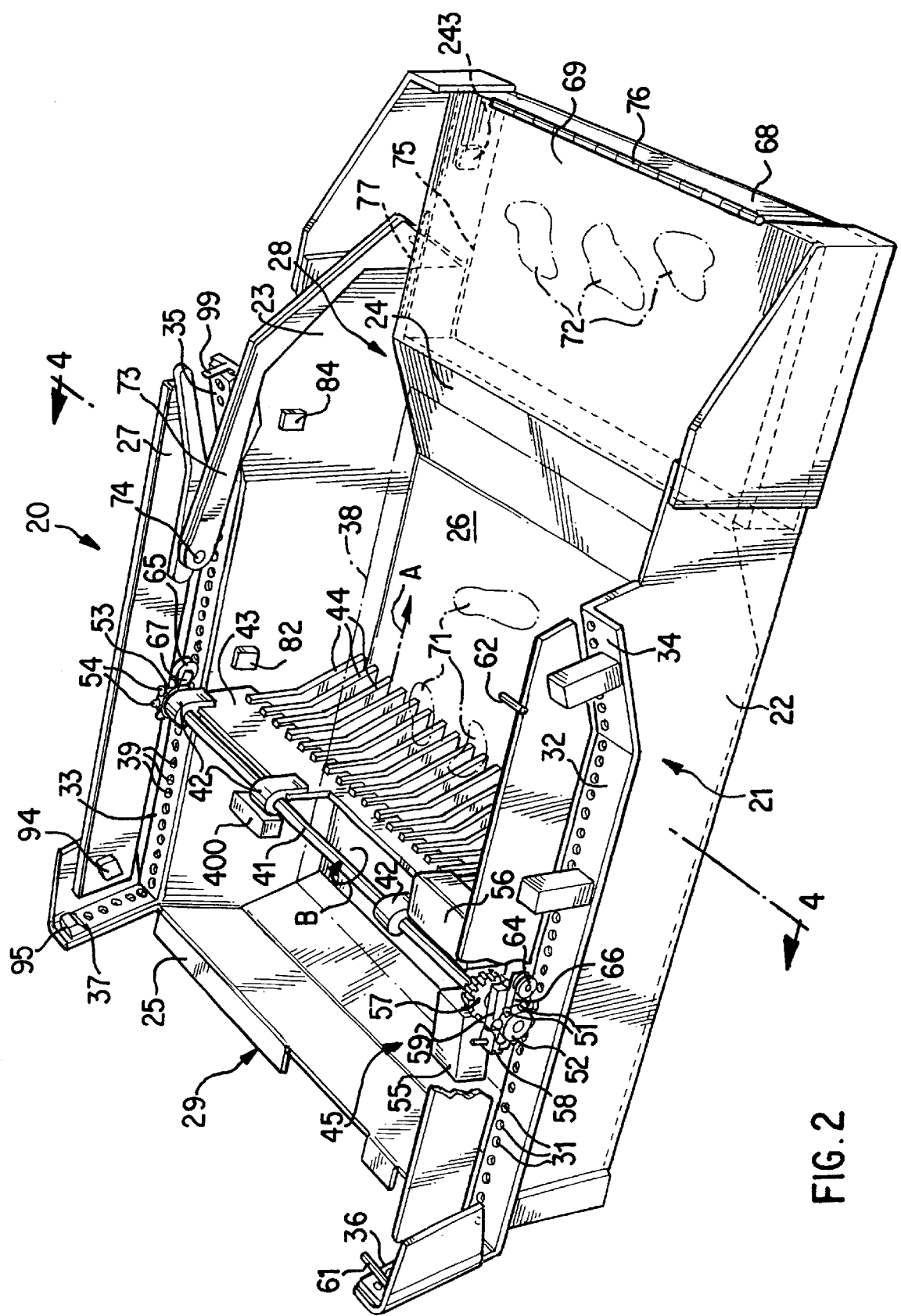
FIG. 2 is a perspective view of the litter box of FIG. 1 in an intermediate condition with the comb traversing the litter box between the storage position and the discharge position.
Figure 3:
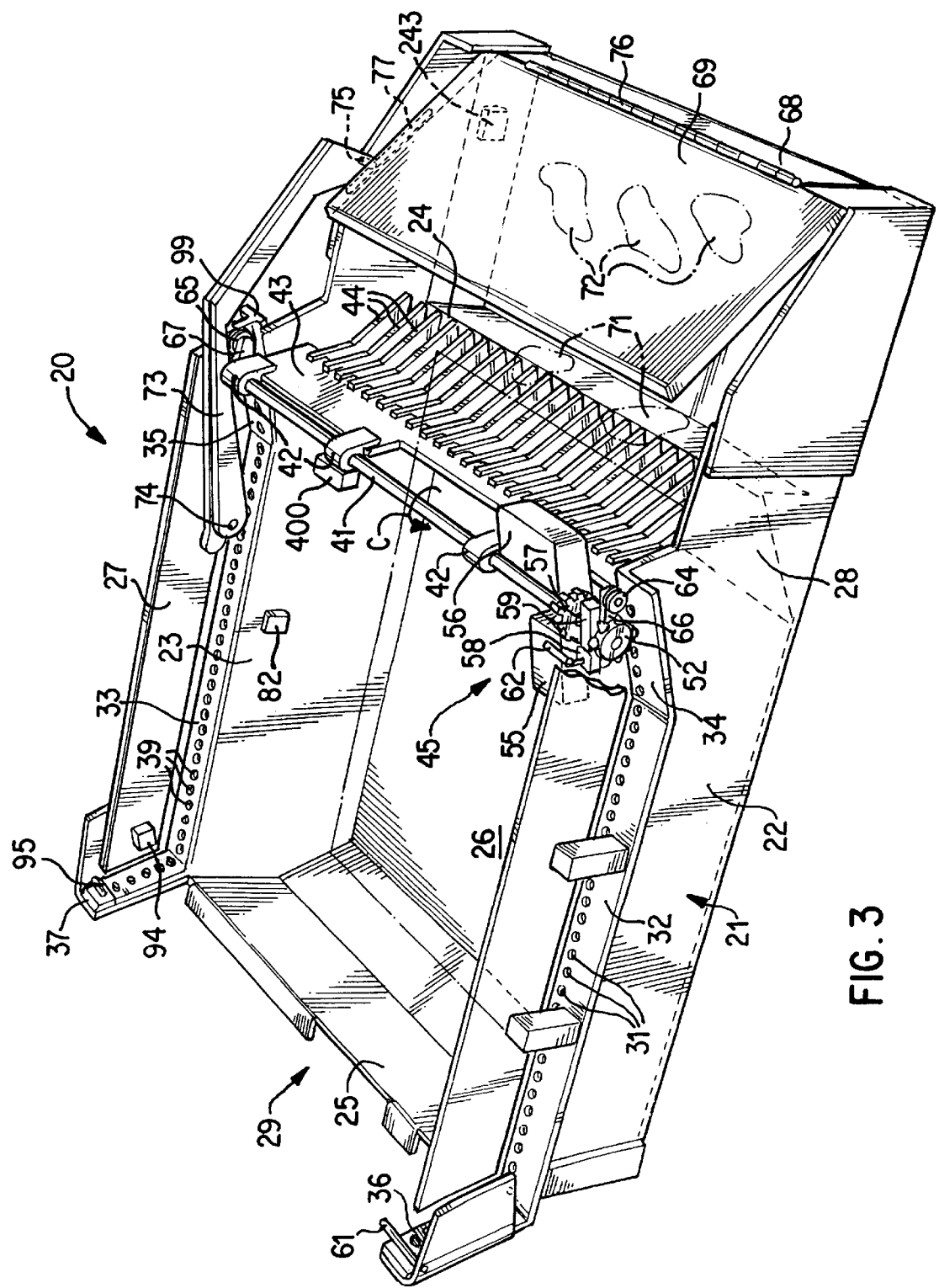
FIG. 3 is a perspective view of the litter box of FIG. 1 in a discharge condition with the comb in the discharge position.

A comb shaft 41 extends across the litter box 20 between two side tracks 32, 33. There are four hangers 42 journalled on and depending from the shaft 41. Three of the hangers 42 appear in FIGS. 1–3. The fourth hanger 42 can be seen in FIG. 4. A comb or rake 43 is suspended from the hangers 42 and includes a plurality of tines 44. In FIG. 1, which illustrates a waiting, or storage, condition, the comb 43 is located at the comb storage end 29 of the litter box 20, and the tines 44 are elevated above the litter fill level 38. In FIG. 2, which illustrates an intermediate condition, the comb 43 is traversing the litter box 20 from the storage end 29 to the discharge end 28, and the lower ends of the tines 44 project down into the litter in the box 20, close to the bottom 26 of the box 20, also shown in FIG. 4. In FIG. 3, the comb 43 is shown near the end of its raking stroke at the discharge end 28 of the litter box 20. At the discharge end 28 of the litter box 20, the tines 44 of the comb 43 again move upwardly out of the litter.

An elongated near side track or path member 32 extends along the top of the near side wall 22 of housing 21. Track member 32 includes a multiplicity of equally spaced apertures 31. Apertures 31 extend through an inclined portion 34 of rack 32 at the discharge end 28 of litter box 20; they also extend through a more steeply inclined portion 36 of rack 32 at the comb storage end 29 of the litter box 20. This track construction is repeated on the opposite side of housing 21. Thus, an elongated track member 33 projects horizontally from the vertical side wall 23. Track member 33 includes a multiplicity of equally spaced apertures or perforations 39. The pattern of apertures extends along an inclined portion 35 of the track member 33 at the discharge end 28 of litter box 20. It also extends along a more steeply inclined portion 37 of the track 33 located at the comb storage end 29 of the litter box 20.

A first main guide wheel 52 is affixed to the near end of shaft 41. Guide wheel 52 includes a plurality of radially projecting guide pins or teeth 51 engageable in the apertures 31 of track member 32 and its extensions 34 and 36. At the other end of shaft 41 there is a similar main guide wheel 53. The radial projections 54 on guide wheel 53 are engageable in the apertures 39 of track member 33 and its extensions 35 and 37. Guide wheels 52 and 53 cause the ends of shaft 41 to move along tracks 32 and 33, based on rotation of shaft 41, from the storage position of FIG. 1 through the intermediate position of FIG. 2 to the discharge position of FIG. 3 and back to the FIG. 1 storage position.

Figure 4:
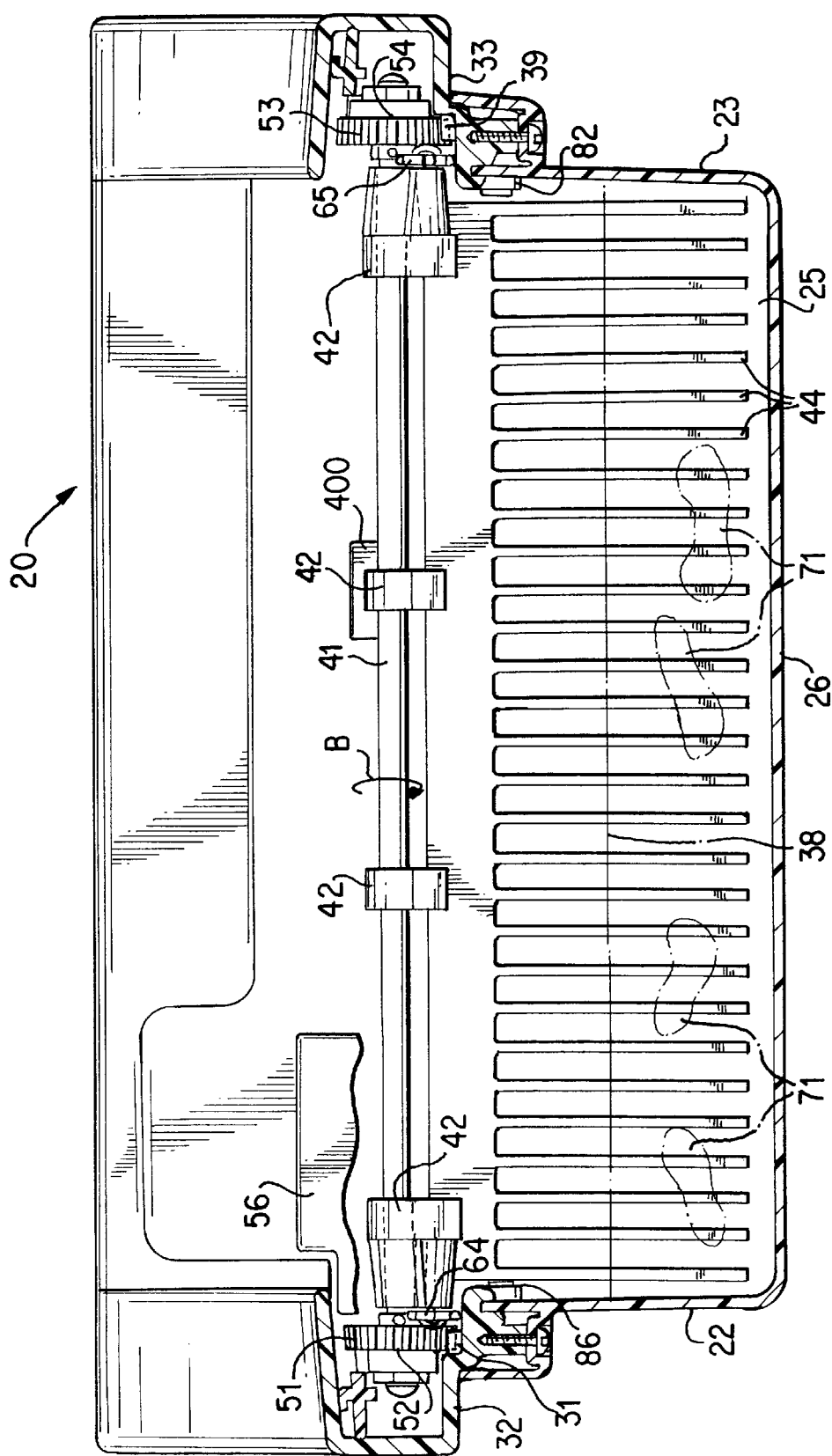
FIG. 4 is a transverse sectional view taken along line 4—4 of FIG. 2 and includes the dress panels.

In addition to the main guide wheels 52, 53 referred to above, the drive and guidance system of litter box 20 includes two auxiliary guide wheels 64, 65, located on the near and far sides of the litter box 20, respectively, as seen in FIGS. 1–3. Auxiliary guide wheel 64 is mounted at the end of a lever 66 that projects from one of the hangers 42 used to suspend comb 43 from shaft 41. Auxiliary guide wheel 64 rides along track 32 throughout the length of that track, including its upwardly inclined end sections 34 and 36. Similarly, the auxiliary guide wheel 65 is mounted on a lever 67 and engages the other track member 33 and its extensions 35, 37 (FIG. 4).

Figure 5:
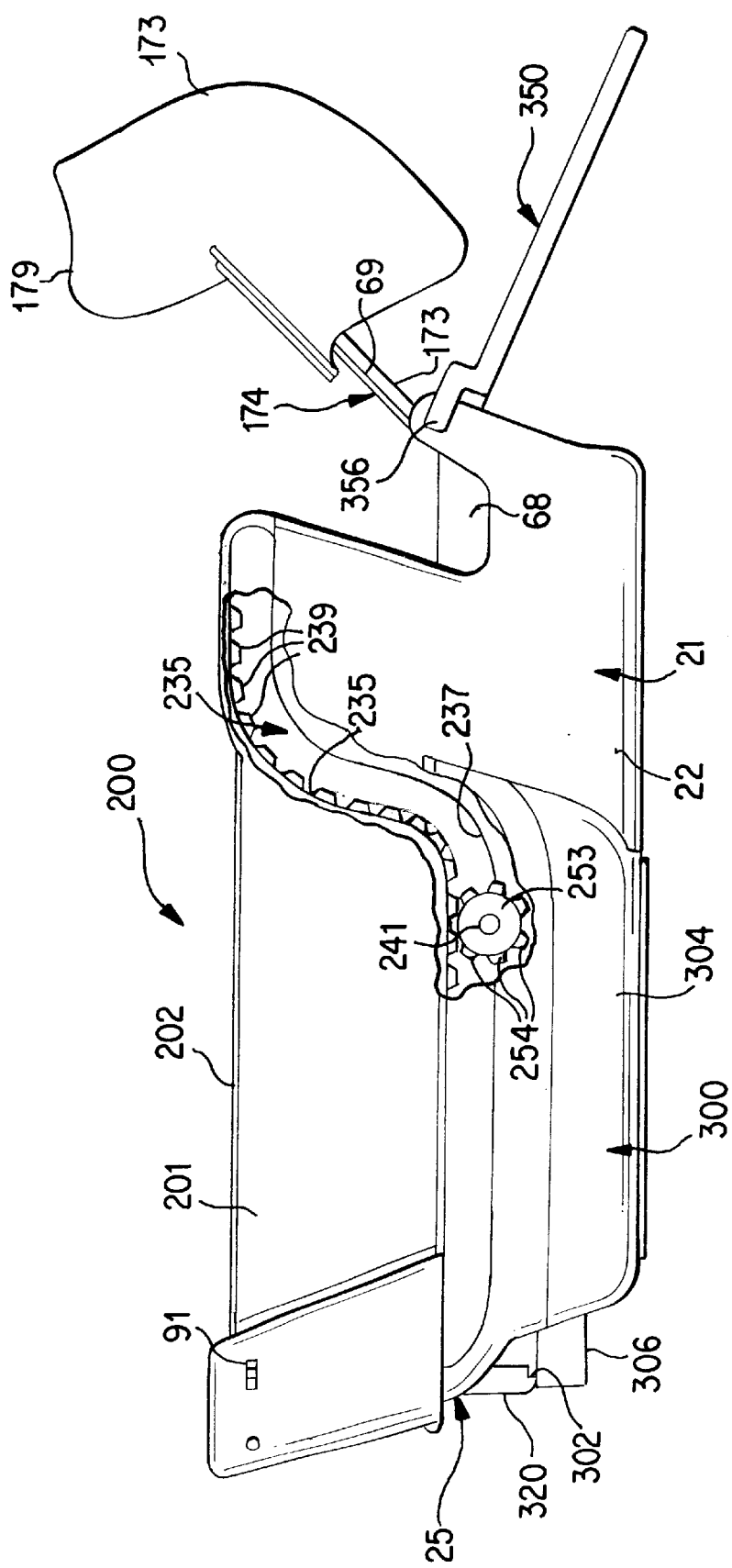
FIG. 5 is a side view, partially broken away, of another litter box constructed in accordance with the invention.

FIG. 5 illustrates an alternative track 231. In particular, the track 231 includes an upper surface 235 spaced apart from a lower surface 237 and a plurality of teeth 239 depending from the upper surface 235. A guide wheel 253 for use with the track 231 includes a plurality of cogs 254 for engaging the teeth 239. A secondary hub 241 extends outwardly toward the side walls from the wheel 253 and is sized to cooperate with the lower surface 237 to prevent the cogs 254 from disengaging from the teeth 239. Advantageously, the use of teeth 239 depending from the upper surface 235 avoids the possibility of litter becoming lodged between the teeth 239 and blocking movement of the wheel 253.

The improved self-cleaning cat litter box 20, FIGS. 1–3, includes a comb drive that comprises a reversible electric motor 55 mounted on and connected in driving relationship to the shaft 41 that supports comb 43; the final gear 57 of the gear train that connects motor 55 to shaft 41 is the only gear that appears in the drawings. The motor 55 is energized by batteries contained in a battery case 56. Motor 55 and the gear train represented by gear 57, as well as battery case 56, are supported by shaft 41; in conjunction with the shaft, they constitute the carriage 45 for the comb 43 in litter box 20. A reversing switch 58 is mounted on and electrically connected to motor 55. A lever 59 is mechanically connected to reversing switch 58. Lever 59 has a limited pivotal movement, from the position shown in FIG. 1 to the position illustrated in FIG. 2. A first switch actuation pin 61 is located adjacent the comb storage end 29 of litter box 20. A similar fixed switch actuation pin 62 is positioned at the other end, the discharge end 28, of litter box 20.

Figure 6:
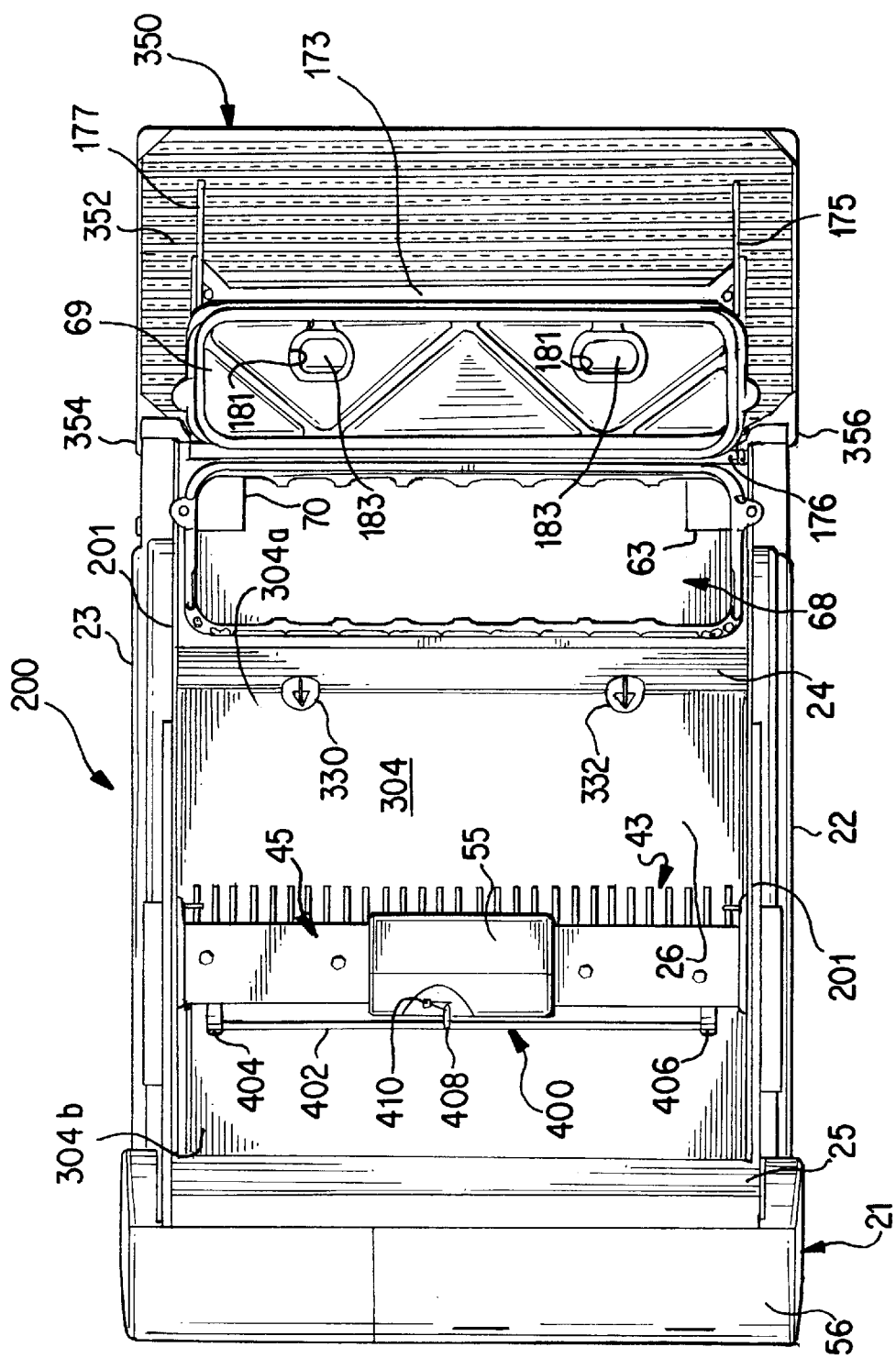
FIG. 6 is a plan view of the litter box of FIG. 5.
Figure 29:
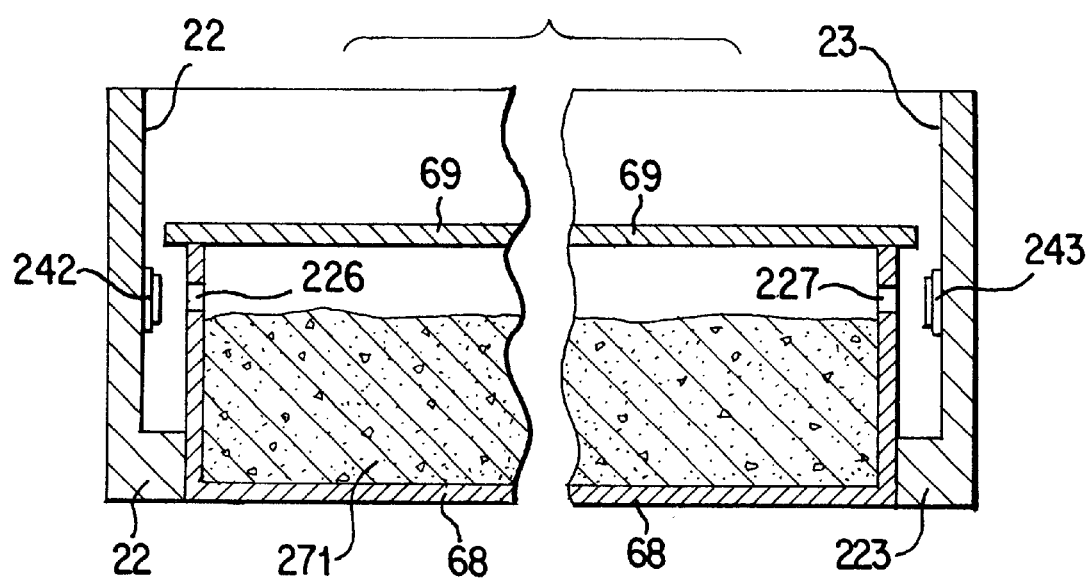
FIG. 29 is a sectional view of the waste receptacle of the Self-Cleaning Litter Box illustrated in FIG. 1 with a lid of the receptacle in a closed position.

A waste receptacle 68 is positioned immediately adjacent to the discharge end 28 of the litter box 20. In FIGS. 1 and 2, waste clumps 71 are indicated in the litter chamber; similar clumps 72 are shown, in FIGS. 1–3, as being already deposited in receptacle 68. Receptacle 68 has a hinged lid 69 and a pair of indentations 63, 70 (FIG. 6). The indentations 63, 70 are formed in the bottom of the receptacle 68 and receive bosses 222, 223 (FIG. 29). The bosses 222, 223 retain the waste receptacle 68 in position within the litter box 20. Waste receptacle 68 and its lid 69 are preferably formed of a biodegradable material. Moreover, receptacle 68 should be transparent; alternatively, lid 69 may be transparent or, of course, both may be transparent enough to permit the user to visually check the level of waste and litter in the receptacle 68. Lid 69 is engaged by a pin 75 on a lid lift lever 73 that is pivotally secured to a vertical extension 27 of side wall 23. The pivotal connection is indicated at 74. There need be no comparable lid lift mechanism 73–75 at the near side of the machine,though one could be provided if motor 55 and battery case 56 were mounted closer to the center of the litter box.

Waste receptacle 68 may be formed of plastic or other suitable material. The lid 69 for receptacle 68 is hinged to the receptacle as indicated at 76. A hinge of the so-called "piano" type may be used, but other hinge structures are acceptable. Lid 69 may also be formed of plastic. On the other hand, receptacle 68 and its lid 69 may be fabricated of other appropriate material. Preferably, receptacle 68 initially serves as a container for clean litter so that, once the receptacle 68 is ready to be discarded, it can simply be removed and a new receptacle 68 put in place after emptying clean litter from the new waste receptacle 68 into the chamber afforded by housing 21.

A sensor may be used to determine whether or not the receptacle is full. In the embodiment of FIGS. 1–3, a sensor 243, preferably a photodetector, is mounted on side wall 23 at a level indicative of a full receptacle. An appropriate light source 242 is mounted on side wall 22 opposite photodetector 243. When the litter level rises in the receptacle to block the light from the source 242, photodetector sounds an alarm, such as a buzzer, to alert the user.

Another sensor may be utilized to sense the exit of a cat from the litter chamber afforded by housing 21. In the embodiment of FIGS. 1–3, there are two such sensors 82, 84, both mounted on wall 23 above the litter fill line 38. Devices 82 and 84 may comprise conventional photo detectors, each receiving a light beam from a source (not shown). FIG. 4 shows an appropriate light source 86 mounted on wall 22 above fill level 38. Photodetector 82 (FIG. 4) is also located above fill level 38. A single light source located centrally along the length of wall 22 can be used or there may be two such light sources 86, one for each of the photo detectors 82, 84.

Figure 7:
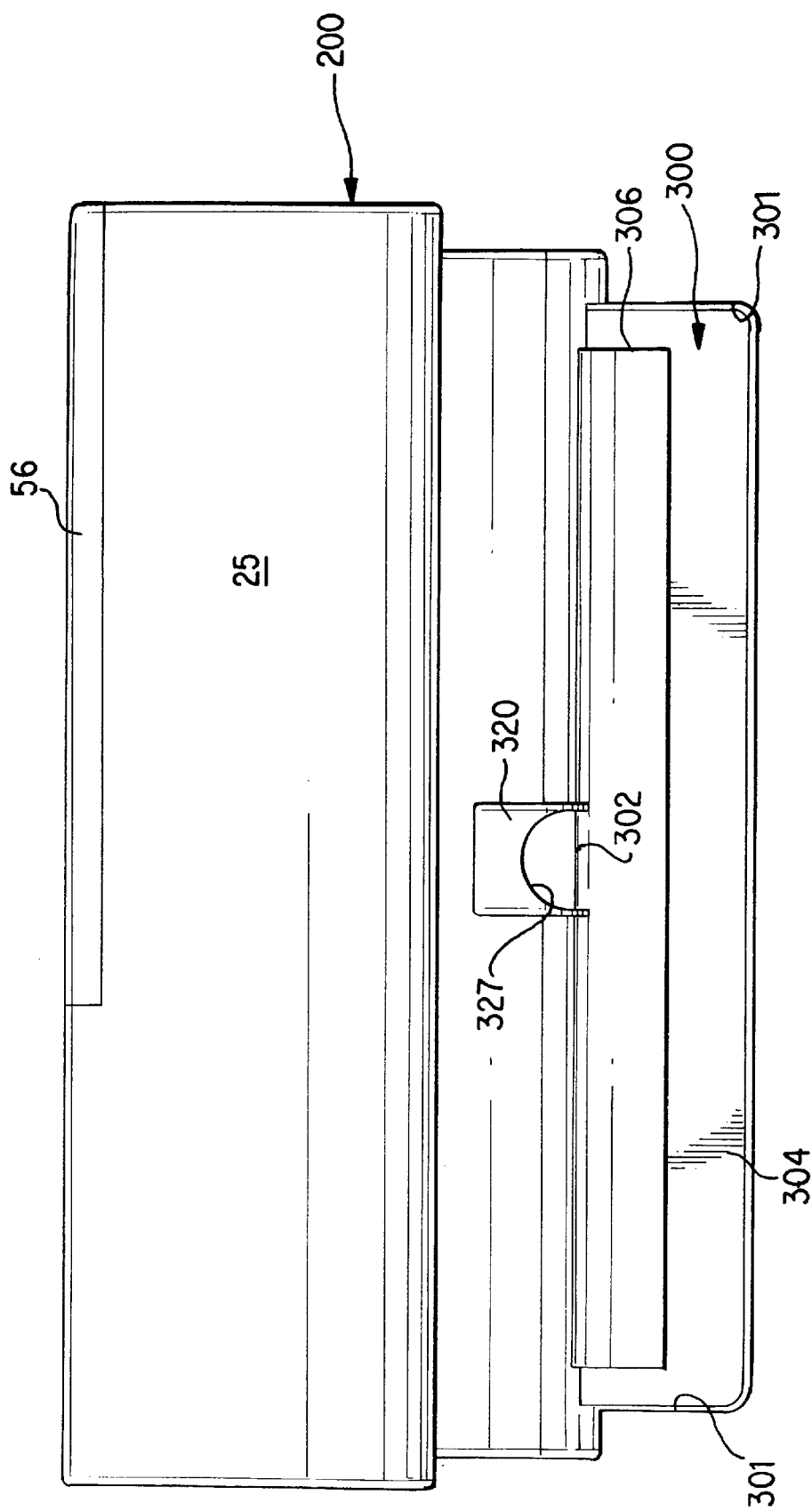
FIG. 7 is an end view, as seen from the storage end, of the litter box of FIG. 5.

As shown in FIGS. 5–7, a removable litter tray 300 is disposed in the litter box 20 adjacent the bottom 26. The tray 300 includes a handle portion 306 and a tray portion 304. The tray portion 304 is filled with litter to the fill line 38 as discussed above. The tray portion 304 includes a distal end 305 and a proximal end 307 and is designed to slide through an opening 301 of the storage end wall 25. The side walls 22, 23 of the housing 21 may contain rails, detent projections or other mechanisms (not shown) to ensure the sliding engagement of the tray portion 304 in the litter box bottom 326. The tray portion 304 is slid through the storage end wall 25 until the distal end 305 of the tray portion 304 comes into contact with the discharge end wall 24. When the tray portion 304 comes into contact with the discharge end wall 24, the handle portion 306 of the removable litter tray 300 extends through the storage end wall 25. In preferred embodiments, the corners and edges of the housing 21 and the removable tray 300 are rounded to facilitate cleaning as illustrated, for example, in FIGS. 4 and 7. Preferably, the apparatus 200 has no nooks, crannies or other small spaces of the type that would permit litter or waste to slip out of or become lodged in the apparatus 200.

Other features are also illustrated in FIGS. 5–6. In particular, an alternative lift mechanism 174 includes a lift plate 173, connected to the litter box 20 by a hinge 176, and a pair of end walls 175, 177 disposed orthogonally to the plane of the lift plate 173. Each end wall 175, 177 includes a camming edge 179 operatively disposed to engage the carriage 45 as the carriage moves to the discharge position. Preferably, the lift plate 173 includes a plurality of apertures 181 for receiving complementary tabs 183 formed on the lid 69 of the receptacle 68. The tabs 183 fit in the apertures 181 with a friction fit to connect the lid 69 to the lift plate 173. Thus, as the carriage 45 approaches the discharge position, it engages the camming edges 179 and pivots the lift plate 173 about the hinge 176 to open the waste receptacle 68. The friction fit of the tabs 183 in the lift plate 173 allows the lid 69 to be easily removed from the lift plate 173 to be disposed of with a full waste receptacle 68.

As shown in FIGS. 5 and 6, the apparatus 200 also has parallel side walls 201 on opposite lateral sides. The side walls 201 may be formed of a suitable plastic material. The side walls 201 have top edges 202 extending from the back to the front of the apparatus 200. The side walls 201 help prevent cat litter or other debris from being spilled out of the apparatus 200.

Figure 8:
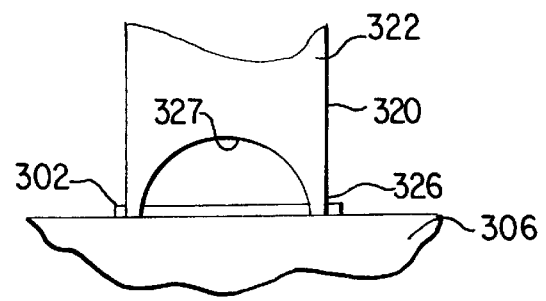
FIG. 8 is a front view of a locking tab and a locking projection, according to a preferred embodiment of the present invention, for retaining a removable litter tray in the litter box of FIG. 5.
Figures 9, 10:
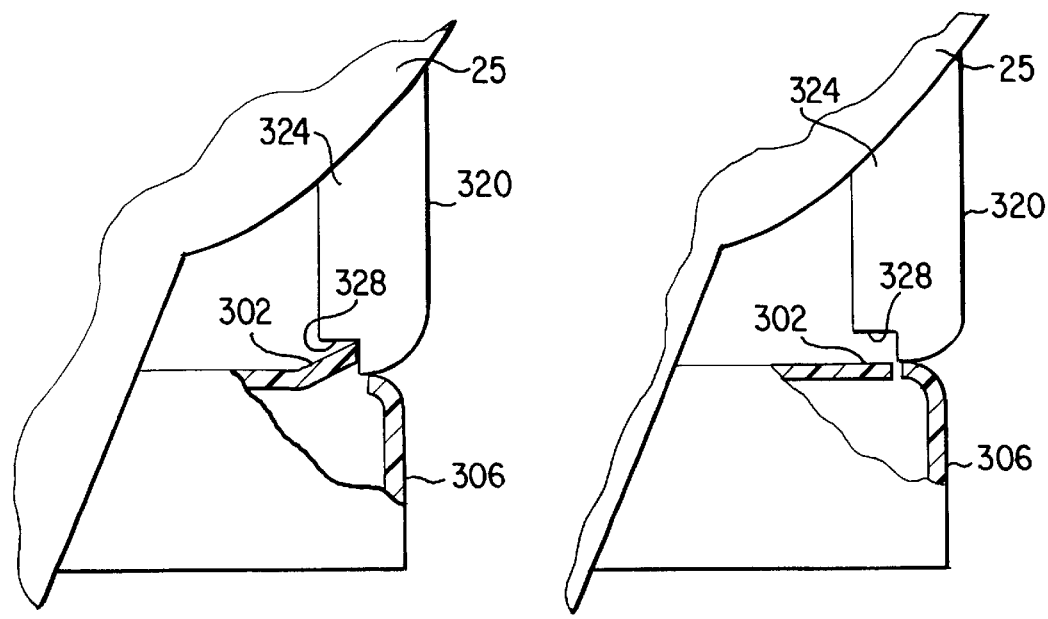
FIG. 9 is a partially broken away side view of the locking tab of FIG. 8 engaging a locking notch formed on the locking projection.
FIG. 10 is a partially broken away side view of the locking tab of FIG. 8 illustrating the locking tab in a depressed position to disengage the locking tab from the locking notch.
Figure 13:
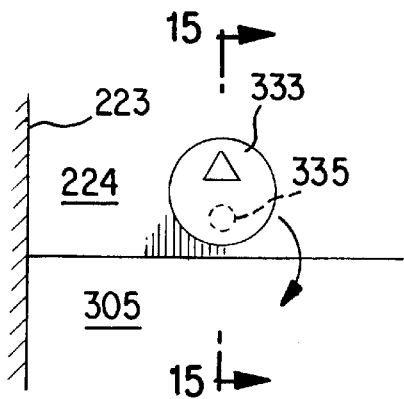
FIG. 13 illustrates the rotating lock of FIG. 11 in an unlocking position.

As illustrated in FIGS. 8–10, the handle portion 306 includes a resilient locking tab 302 formed therein. A locking projection 320 extends downwardly from the outside surface 325 of the comb storage end wall 25 to a distal end 326. The locking projection 320 includes a front wall 322 and a pair of sidewalls 324 extending from the edges of the front wall 322 to define a U-shaped channel. The distal end of the front wall 322 includes a semicircular opening 327 (FIG. 8), and the distal end of each sidewall 324 includes a notch 328, (FIGS. 9–10). The notches 328 are disposed to engage the locking tab 302 when the tray portion 304 is completely slid into the housing 21.

When the litter tray 300 is disposed in the litter box 20, the locking tab 302 engages the notches 328 to retain the tray 300 in the litter box 20. To remove the tray 300, a user inserts a finger into the semicircular opening 327 and depresses the resilient locking tab 302, causing the tab 302 to disengage from the notches 328. Although a locking projection 320 and a locking tab 302 have been illustrated, it will be appreciated that other latching mechanisms can be used. The locking tab 302 is preferred, however, because it is easy to operate and is readily formed integrally with the removable tray during the molding process.

Figure 14:
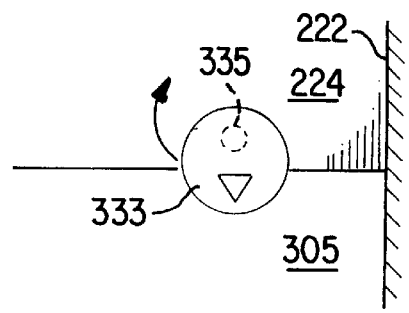
FIG. 14 illustrates the rotating lock of FIG. 11 in a locking position.
Figure 11:
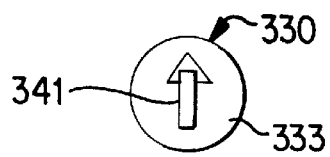
FIG. 11 is a top view of a rotating tray lock for retaining the removable tray in the litter box of FIG. 5.
Figure 12:
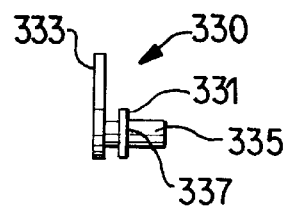
FIG. 12 is a side view of the rotating tray lock of FIG. 11.

In addition to the locking tab 302, the litter box 20 includes a pair of tray locks 330, illustrated in FIGS. 11–15, disposed on the discharge end wall 24. As shown in FIGS. 11–12, each tray lock 330 includes a locking disk 333 and a shaft 335 that projects from the bottom surface of the disk 333 and is offset from the center of the disk 333. The shafts 335 include a groove 337 for receiving a circlip 338. The shafts 335 are sized to extend through apertures 339 formed in the discharge end wall 224, with the disks 333 cooperating with the circlip 330 to retain the tray locks 330 in position. Thus, tray locks 330 are rotatably connected to the discharge end wall 224. The apertures 339 are located on the end wall 224 so that the offset portion of the disk 333 rotates between an unlocking position (FIG. 13), wherein the removable tray 304 is released for removal, and a locking position (FIG. 14). In the locking position, a portion of the disk 333 overlaps the distal end 305 of the removable tray to prevent removal, as illustrated in phantom in FIG. 15. The tray locks 330 can be adapted to have grooves 341. The grooves 341 would be used to allow a tool 334, such as a screwdriver or a coin, to lock and unlock the tray locks 330. Other indicia 343 may be added to indicate whether the tray locks 300 are in the locking or unlocking position.

Figure 15:
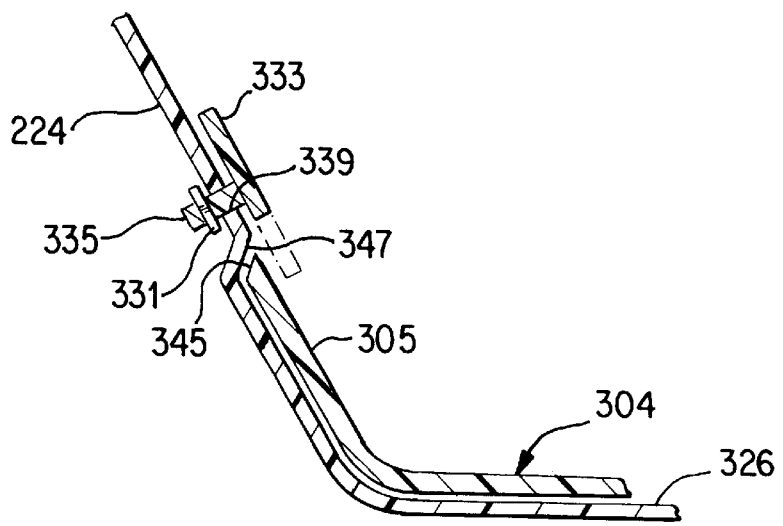
FIG. 15 is a partial section view along line 15—15 of FIG. 13, through the litter box and removable tray of FIG. 5 illustrating a rotating tray lock in relation to the litter box and removable tray.

As illustrated in FIG. 15, the removable tray 300 preferably includes a beveled edge 345 formed on the distal end 305, and the discharge end wall 224 includes a beveled step 347 formed to be complementary to the beveled edge 345. The beveled edge 345 and step 347 cooperate to provide a seam that resists litter intrusion.

Figure 16:
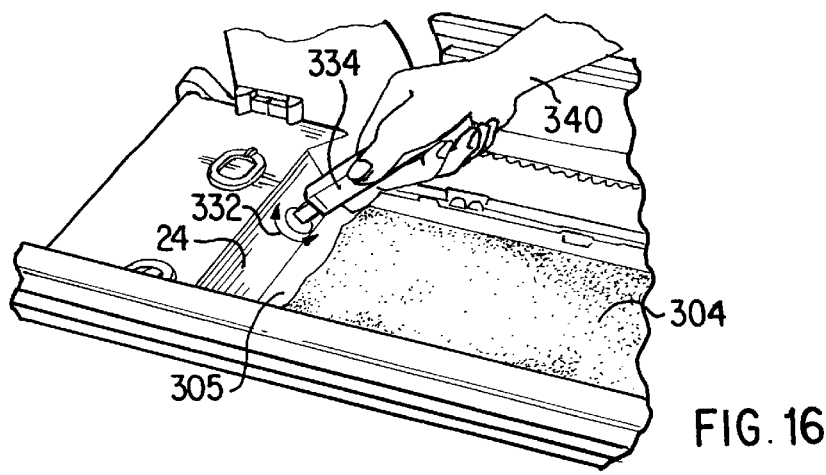
FIGS. 16–18 are partial perspective views illustrating the sequence of removing a removable litter tray from the litter box of FIG. 5.
Figure 17:
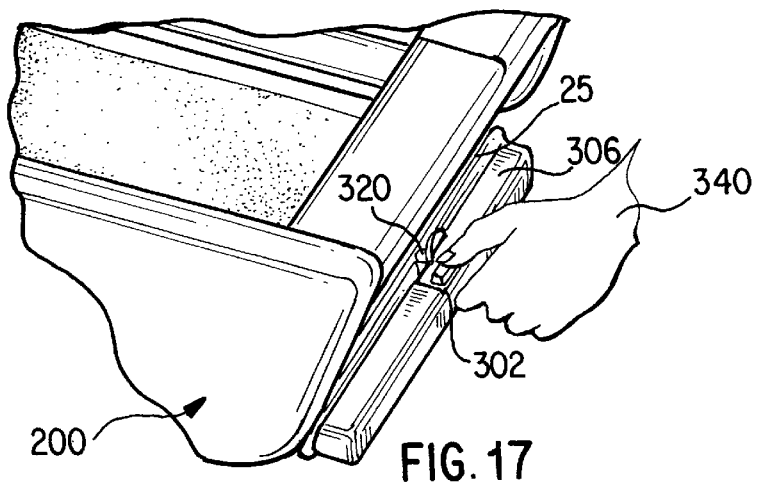
Figure 18:
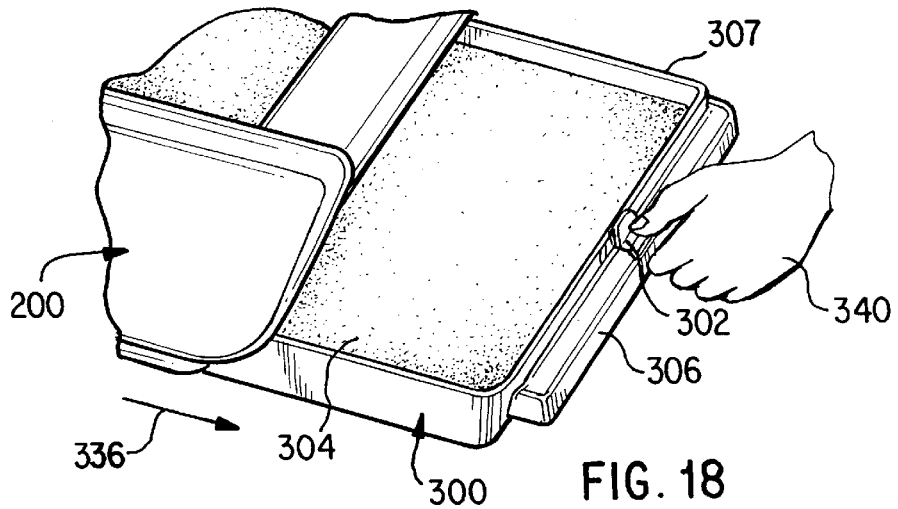

To remove the litter tray 300, as illustrated in FIGS. 16–18, a user inserts a tool 334 into the tray locks 330 to rotate the tray locks 330 in direction 332 (FIG. 16) to the unlocking position. Of course, different tray locks 330 can be used. For example, a sliding tray lock could be used. Once both tray locks 330 are in the unlocking position, the user may depress the locking tab 302 (FIG. 17) to disengage the tab 302 from the locking projection 320. Once disengaged, the tray 300 may be removed from litter box 20 by pulling on the handle portion 306 in the direction 336 (FIG. 18).

Figure 19:
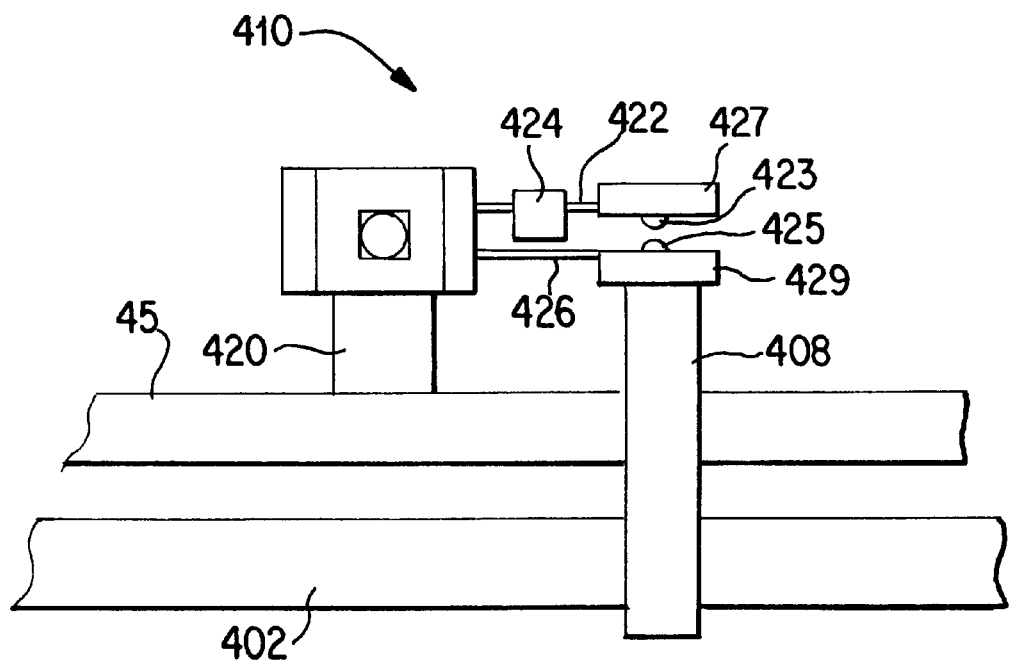
FIG. 19 illustrates a reverse sensing leaf switch, according to a preferred embodiment of the present invention, in an open-circuit configuration.
Figure 20:
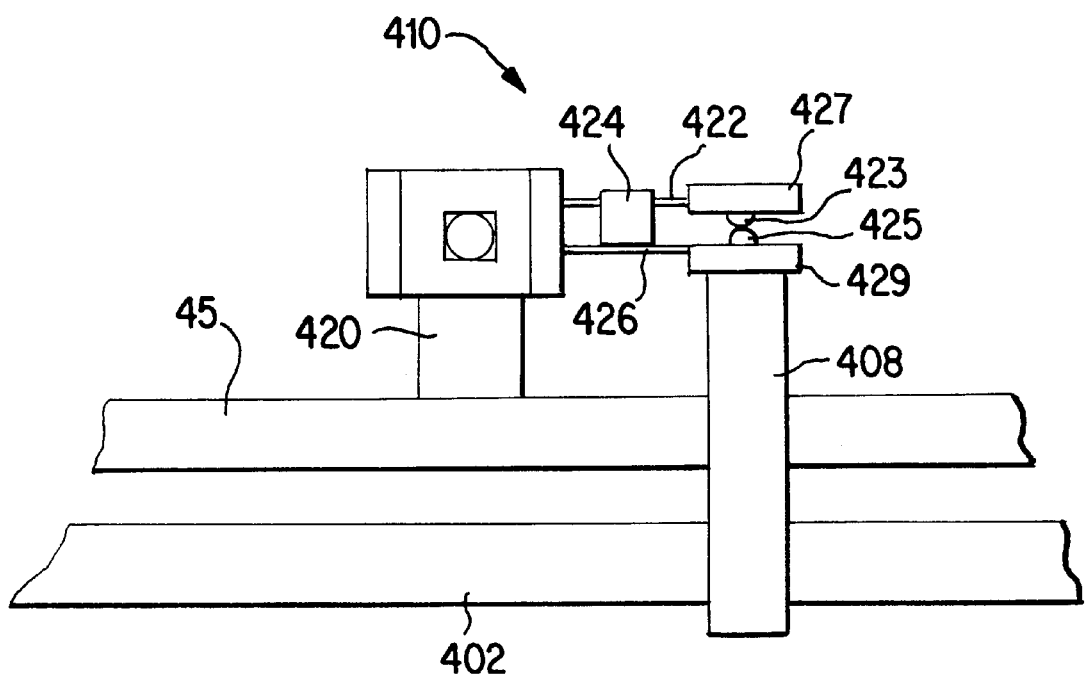
FIG. 20 illustrates the leaf switch of FIG. 19 in a closed-circuit configuration.

In the preferred embodiment of the present invention, as shown schematically in FIGS. 1–3 and in detail in FIGS. 19–20, a reverse sensor 400 is coupled to a back side of the carriage 45 to avoid injury to a cat in the event that the carriage makes contact with the cat during movement toward the storage position. It will be appreciated that a forward sensor can be used to avoid injury to a cat if the carriage 45 contacts the cat during movement toward the discharge position. The reverse sensor 400 includes a reverse sensing bar 402, an actuating bar 408, and a leaf switch 410. The leaf switch 410 is connected to the carriage 45 at a point adjacent the actuating bar 408. The reverse sensing bar 402 held in a flexible relationship with the carriage 45 by first and second bar holders 404, 406 molded therein (FIG. 6). The bar holders 404, 406 contain springs (not shown) to provide this flexible relationship.

Referring to FIG. 19, the leaf switch 410 includes a base 420, a flexible leaf switch arm 426, a rigid leaf switch arm 422 and a leaf switch arm separator 424. The separator 424 prevents the contacts 423, 425 from inadvertently making contact. The leaf switch arms 422, 426 have leaf switch contacts 423, 425. The leaf switch arms 427, 429 may also include leaf switch contact protectors 427, 429, respectively, to prevent damage to the contacts 423, 425.

When the carriage 45 contacts a cat, or other obstruction, a force is applied to the reverse sensing bar 402, and the force is transmitted to the flexible leaf switch arm 426 by the actuating bar 408. The actuating bar 408 pushes the leaf switch arm 422 to bend the arm 422 around the leaf switch arm separator 424, causing the leaf switch contact 425 to touch contact 423. The leaf switch 410 is closed, and an electrical connection is maintained, while the contacts 423, 425 are in contact with each other. When the leaf switch 410 is closed, a signal is generated to stop and reverse the motor 55 (described below).

The leaf switch 410 is resiliently biased toward its open position (that is, the contacts 423, 425 are biased away from each other). The leaf switch 410 will be closed (as described above) when the sensing bar 402 contacts the end wall 25 and the contact 425 of the flexible leaf switch arm 426 is forced into contact with the contact 423 of the rigid leaf switch arm 422.

Figure 21:
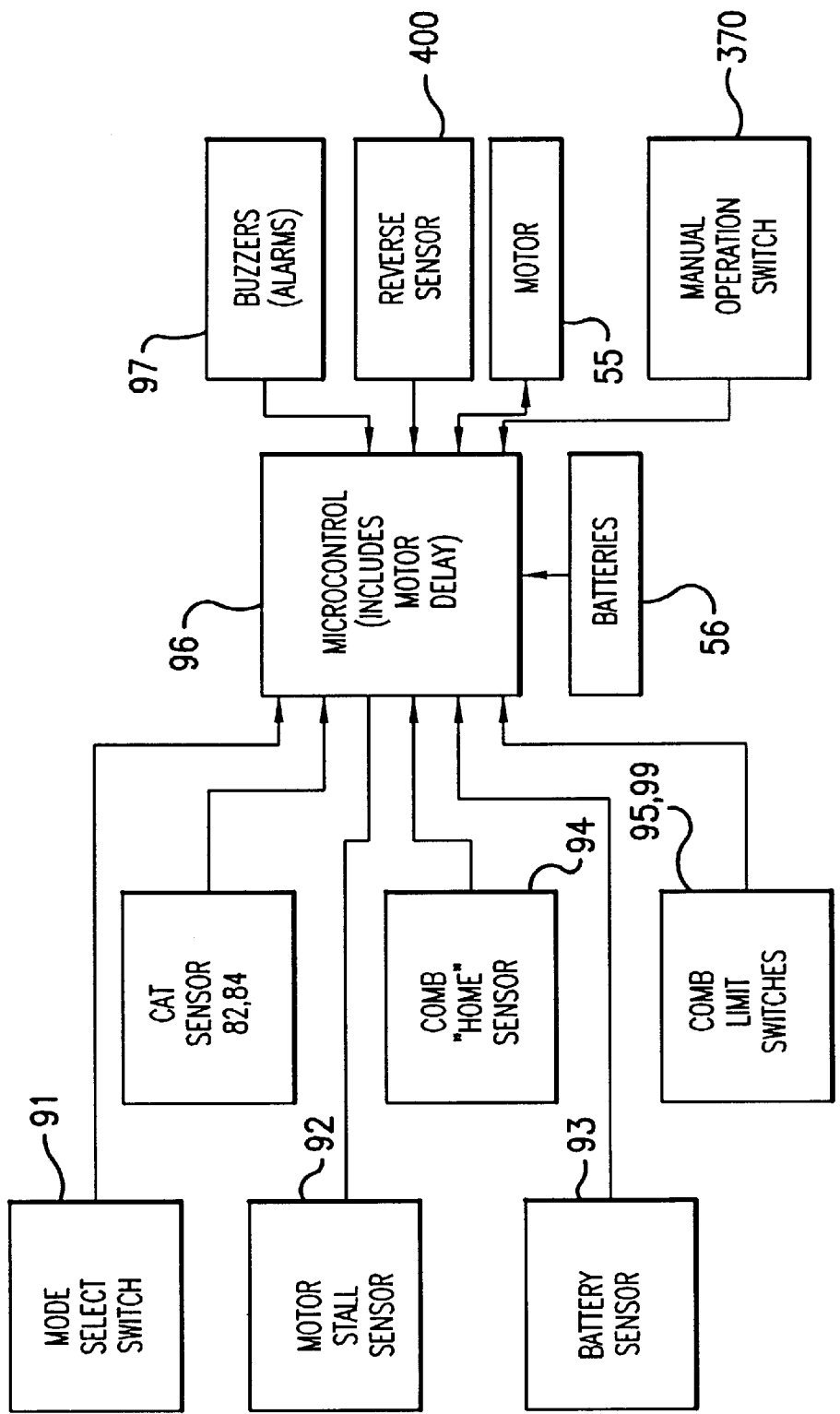
FIG. 21 is a block diagram of the drive and control for the litter box of FIG. 5.

Referring now to FIG. 21, motor 55 is energized from battery 56 through a pre-programmed micro-processor control 96. Although not shown in FIG. 21, a conventional electrical power supply may alternatively be used to energize the motor 55. Control 96 receives input signals from single space sensors 82, 84. Additional inputs to control 96 may be supplied by a mode select switch 91, a motor stall sensor 92, a battery voltage sensor 93, a home position sensor 94 for the comb 43, a reverse sensor 400, and a manual operation switch 370.

The mode select switch 91 (FIG. 5) is a three position switch. The mode select switch 91 is switchable between an automatic operation selecting position, a manual operation selecting position and an off position. The mode select switch 91 allows a user to decide how the litter box 20 is to operate (manually, automatically, or not at all). No power is supplied to the litter box 20 when the mode select switch 91 is in the off position. The mode select switch 91 provides an automatic operation input and a manual operation input to the control 96. In the off modes no input is generated because all components, including the control 96, will not be functioning.

The motor stall sensor 92 determines whether the motor 55 is stalled. If the motor 55 is started by the control 96, but becomes stalled, the motor stall sensor 92 will supply a motor stall input to the control 96.

The battery voltage sensor 93 determines whether there is a low battery voltage condition. If there is a low battery voltage condition, the battery voltage sensor 93 supplies a low battery voltage condition input to the control 96. The control 96 sends a signal to sound a buzzer 97 when the low voltage input is received.

The home position sensor 94 for the comb 43 determines whether the comb 43 has reached the "home" position. If the comb 43 has reached the "home" position, the home position sensor 94 supplies a "home" position input to the control 96. In response to the home position input, the control 96 stops the motor 55.

A manual operation foot switch 370 (FIG. 22) allows a user to initiate manual operation of the litter box 20 by closing the switch 370 if the mode selector switch 91 is in the manual position. When the switch 370 is closed, a manual operation switch activated input is sent to the control 96.

Limit switches 95, 99 may be provided at the storage end 28 and at the discharge end 29 of the litter box 20. One or more buzzers or other alarm devices 97 are included in the circuit so that the cat owner can be signaled when the litter box 20 is functional or when other conditions occur, such as an insufficient litter supply in the box 20 or a fill waste receptacle 68 or low battery voltage.

If desired, the apparatus 200 may be provided with a shut-off timer system (not illustrated). The shut-off timer system may be used to disable operation of the apparatus 200 for a predetermined period of time, for example, six hours. Thus, for example, the apparatus 200 may be disabled during the middle of the night, so that the apparatus 200 does not disturb resting persons or other pets. A push button over-ride system (not illustrated) may be provided to manually initiate a raking operation when the apparatus 200 is otherwise disabled by the shut-off timer system.

The motor stall sensor 92, battery voltage sensor 93, buzzer 97, and leaf switch 410 of reverse sensor 400 may all be packaged in the same housing with the motor 55. Such packaging would be particularly advantageous by eliminating the need for long wiring runs.

The mode selector switch 91, home position sensor 94, limit switches 95,99 and manual operation switch 370 can be incorporated in the litter box 20 in appropriate positions as desired. Home position sensor 94 may be coupled to or adjacent to the "home" position. For example, if the "home" position is determined to be the storage end 29, then the sensor 94 should be located adjacent to the storage end wall 25. Limit switch 95 can be positioned to be actuated by any part of the comb 43 or the carriage 45. The limit switch 95 is disposed at the storage end 28 of litter box 20 and is activated when the comb 43 or carriage 45 reaches the storage end 28 of the litter box 20. The limit switch 99 is disposed at the discharge end 29 of litter box 20 and is activated when the comb 43 or carriage 45 reaches the discharge end 29 of the litter box 20. Manual operation switch 370 can be positioned adjacent the mode select switch 91, the carriage 45 or any other desired location on the litter box 20.

Figure 23:
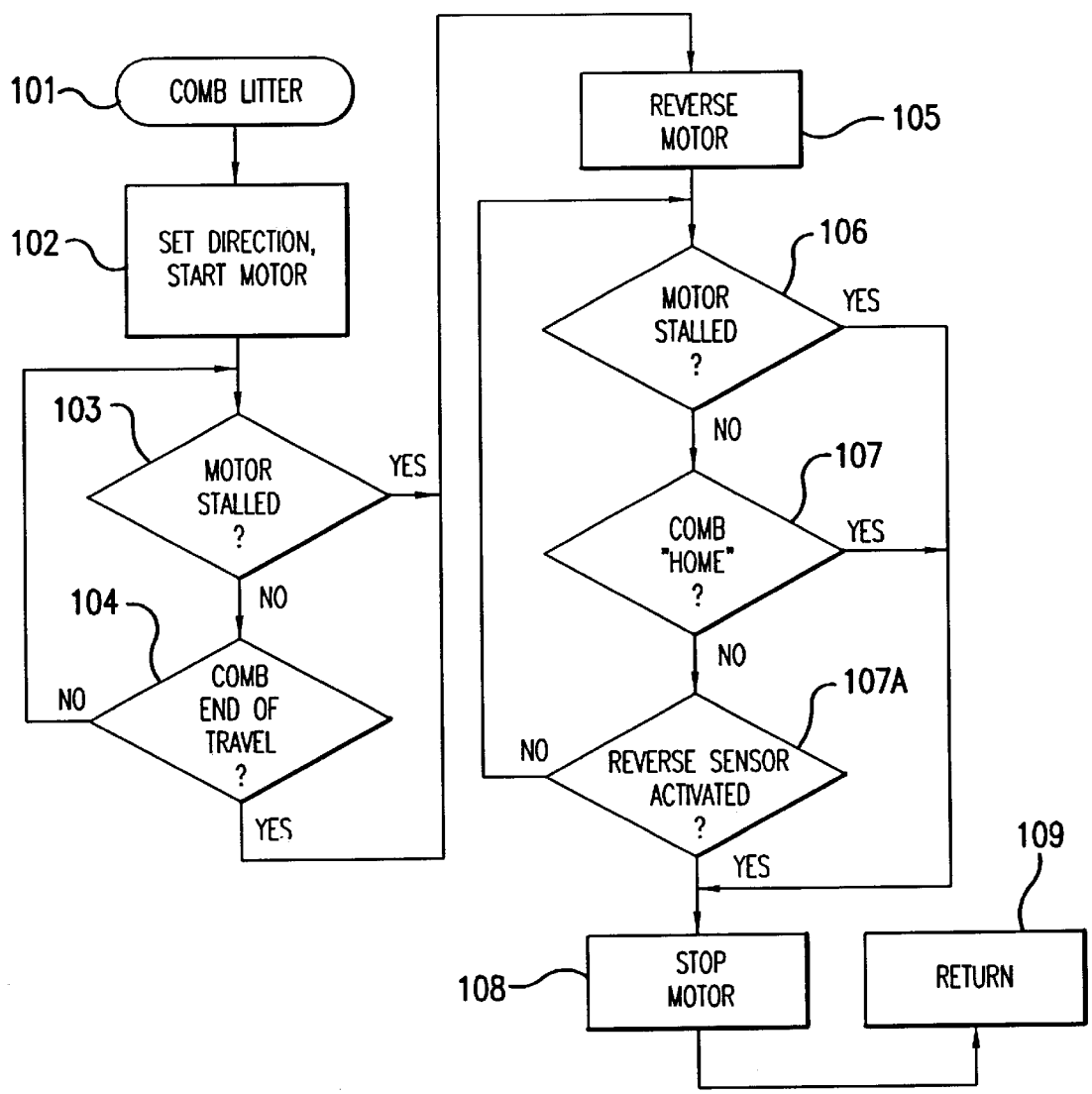
FIG. 23 is a flow chart for operation of the cat litter box of FIG. 5.

In operation, the comb 43 may initially be located at the comb storage end 29. In this condition, the comb shaft 41 is elevated, the guide wheels 52, 53 having ridden up the extensions 36, 37 of tracks 32, 33. The switch 58 and the lever 59 have engaged the pin 61; the motor 55 is shut off, but is set for forward movement. Removable tray 300 is filled with litter, approximately to level 38. Photo detectors 82 and 84 receive light beams from sources 86 on the near wall 22 of the litter box (FIGS. 4 and 23). With no cat present in the litter box 20, reception of the light beams by photo detectors 82 and 84 is unimpeded. All other mechanisms are in the positions shown in FIG. 1. Lid 69 is closed over the receptacle 68. The receptacle lid 69 is engaged by pin 75 at the end of the lever 73, but remains closed because the lid opening lever 73 is inactive.

At this juncture, it may be assumed that a cat (not illustrated) enters the litter box 20 for the purpose of elimination of either liquid or solid waste. With some kinds of litter, the urine from the cat creates a clump in the litter with which the bottom portion of housing 21 is filled. For solid elimination, the clump is formed by the waste itself In either instance, the cat is likely to bury the waste or to cover it with other litter, especially with respect to solid waste. Thus, clumps 71 are produced by the cat, and those clumps are located at some level in the litter above the bottom of the removable tray 300 (FIG. 23). It is assumed that the box has previously been used and that previously deposited waste clumps 72 are already present in the waste receptacle 68.

While the cat is present in the litter box 20, the light beam to at least one of the photo detectors 82 and 84 is cut off. Usually, both light beams are blocked. However, this does not initiate a self-cleaning operation in the litter box 20. Subsequently, when the cat leaves the litter box 20, the light beam or beams again impinge upon the photo detectors. Accordingly, an output signal from one or both cat sensors is supplied to control 96 (FIG. 21). At this point, however, there still is no actuation of a self-cleaning operation in the box 20 by the comb 43. The reason for the delay is that the cat might return to the litter box, deciding that its elimination activities have not been completed. In these circumstances, the light beams to one or both of the photo detectors 82, 84 are again cut off and the preset delay interval for actuation of a self-cleaning operation is not completed.

Ultimately, the cat leaves the litter box 20 for an interval long enough to exceed the preset time delay that is set into control 96. That time interval is subject to substantial variation; a range of two to seven minutes is usually desirable. The self-cleaning operation carried out by the comb 43 should not be initiated while the cat is in the immediate vicinity because it is undesirable to cause the cat to have reason to be afraid of the litter box 20.

In a preferred embodiment, the operation of the self-cleaning litter box 20 can be also be performed manually. Instead of waiting for the predetermined delay period, as previously described, cleaning of the litter box 20 may be initiated by the cat owner. Manual operation can be achieved by placing the mode select switch 91 (FIG. 5) into a manual operation selecting position. With the mode select switch 91 in this position, inputs from the photo detectors 82, 84 do not initiate the preset delay feature previously described. Instead, the control 96 looks for an input from the manual operation switch 370.

Figure 22:
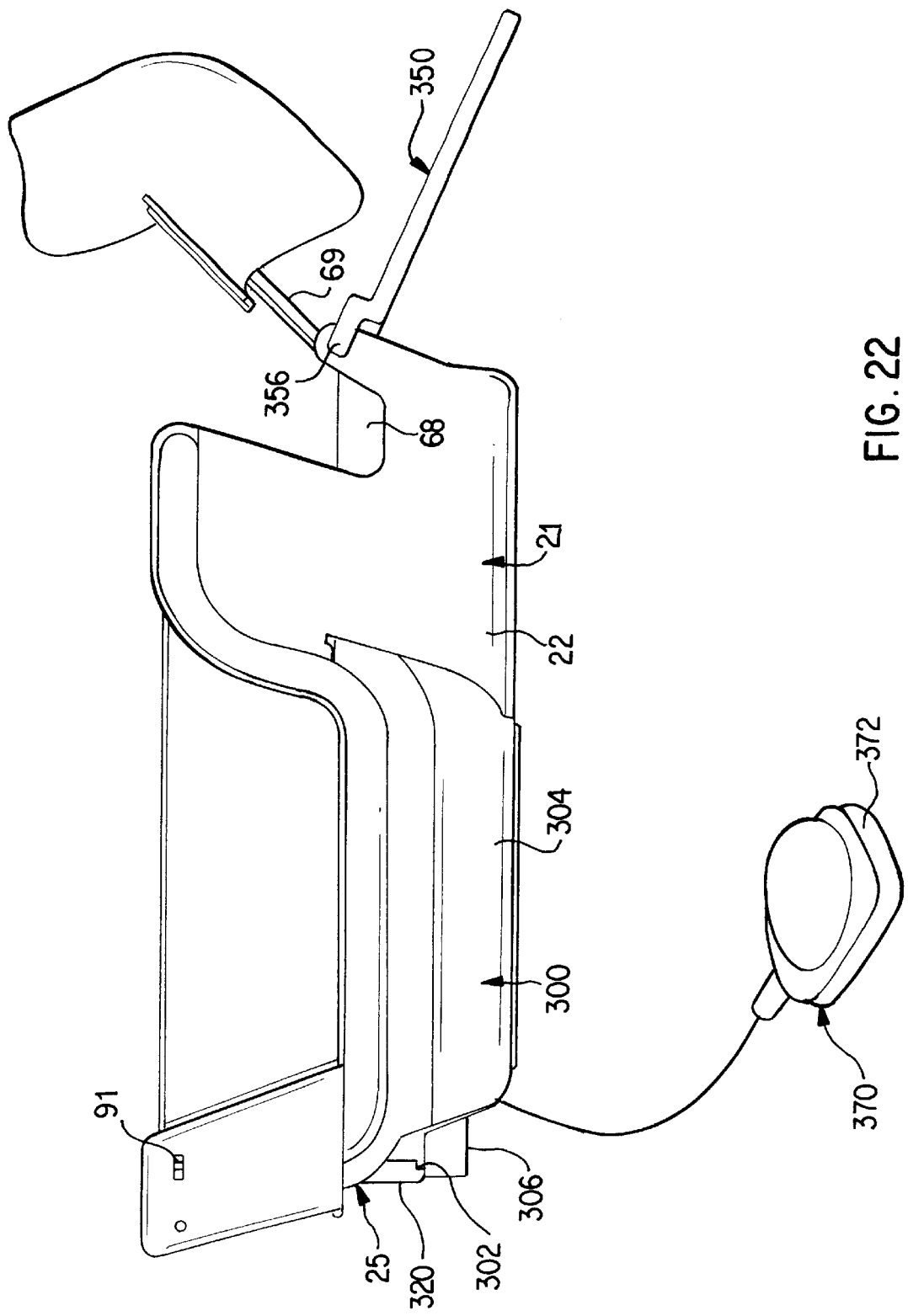
FIG. 22 is a side view of the self-cleaning litter box of FIG. 5, including a manual operation foot switch.

FIG. 22 illustrates the use of a foot switch 372 as the manual operation switch 370. The foot switch 372 is a normally open switch providing no input to the control 96 when open. The foot switch 372 is closed and thus activated when a cat owner steps on it. The closing of the foot switch 372 provides an input to the control 96 causing the comb 43 to rake the litter (described below). This may be desirable when the cat owner wants to remove the waste from the litter box 20 at a time he or she deems appropriate.

After the cat has left litter box 20 for a time exceeding the preset delay interval in control 96 (automatic operation) or after the manual operation switch 370 has been activated (in manual mode), motor 55 is energized from battery 56, or a conventional power supply (not shown), through control 96. As a consequence, gear 57 and shaft 41 are rotated in the direction of the arrow B in FIG. 1. The initial movement of the comb carriage 45 (shaft 41, motor 55, and battery housing 56) is downwardly along track extensions 36 and 37. In the course of this downward movement of comb 43, its tines 44 are pushed downwardly into the litter in the bottom portion of housing 21, well below fill line 38. The bottoms of the tines 44, when this movement is completed, are quite close to the bottom of the removable tray 300, but preferably do not quite engage the bottom.

Motor 55 remains energized and shaft 41 continues to rotate in the direction of arrow B. As a consequence, comb 43 is driven across the litter chamber, from the storage end 29 to the discharge end 28, as indicated in FIG. 2 by arrow A. Reference may also be made to FIG. 4, where the position of the comb and its tines 44 are illustrated. As the comb moves across the litter box 20, in the direction of arrow A, the tines 44 engage any clumps 71 present in the litter, whether generated by the elimination of liquid or solid wastes by the cat. Comb 43 carries the clumps 71 toward the discharge position 28 at the far end of box 20, that is, to the right hand end of the litter box 20 as seen in FIGS. 1 and 2. Comb 43 remains in a substantially erect position as shown in FIG. 2. It is prevented from rotating in the direction of arrow B by the engagement of auxiliary guide wheels 64, 65 with tracks 32, 33 respectively. The forward motion of the comb 43 in the direction of arrow A is effected by rotation of shaft 41 in the direction of arrow B and the engagement of guide wheels 52 and 53 and their pins 51 and 54 in the apertures 31 and 39 of the two tracks 32 and 33 that define the comb path.

Ultimately, the comb 43 advances to a position where its main guide wheels 52 and 53 reach the upwardly inclined extension portions 34 and 35 of tracks 32 and 33, respectively. Motor 55 is still energized; as a consequence, the carriage 45 moves up the ramps or track extensions 34 and 35 to the position shown in FIG. 3. During this upward movement of comb 43, lever 73 is engaged by the comb carriage 45 and is pivoted upwardly from the original position shown in FIGS. 1 and 2 to the elevated position shown in FIG. 3. As a consequence, due to the engagement of pin 75 with a slot or like guide 77 in receptacle cover 69, cover 69 is moved to the open position shown in FIG. 3. When comb 43 reaches the discharge position shown in FIG. 3, the additional clumps 71 are discharged into receptacle 68 to join clumps 72 already present there.

When comb 43 reaches the position of FIG. 3, it actuates the limit switch 99. The resulting output signal to control 96 (FIG. 21) reverses motor 55 and the motor 55 starts to rotate the shaft 41 in the direction of arrow C, FIG. 3. Accordingly, the comb 43 is driven, by motor 55, back to its storage position illustrated in FIG. 1. In the process, the discharge lever 73 is disengaged and drops back down to its original position, so that the lid 69 on receptacle 68 again closes. The waste from the litter box 20 is now totally enclosed in waste receptacle 68.

When comb 43 has finished its movement back to a point closely adjacent to the storage end wall 25, its two main guide wheels 52 and 53 encounter the steeply inclined upward extensions 36, 37 of tracks 32, 33. Motor 55 remains energized and pulls comb 43 and its shaft 41 up to the position shown in FIG. 1. When the comb 43 reaches that position, switch 58 is actuated by pin 61 and sets motor 55 for subsequent operation in the forward direction. When comb 43 reaches the end of its travel, at the position shown in FIG. 1, the comb limit switch 95 (FIG. 21) is actuated and a signal is supplied to control 96 to shut off the motor. A "home" sensor 94 may be provided for the same purpose. Usually, it is desirable to have both a home sensor 94 and a limit switch 95 (see FIG. 21) to actuate the control 96 and make sure that the motor 55 is shut off with the comb 43 at the storage position 29 shown in FIG. 1.

In a preferred embodiment, a reverse sensor 400 (FIGS. 6 and 19–20) is utilized to make sure that the motor 55 is stopped and reversed when the comb 43 strikes an object while returning to the storage position 29. The reverse sensor 400 is normally open and does not provide an input to the control 96 while open. The reverse sensor 400 is closed when the reverse sensing bar 402 strikes an object forcing the actuating bar 408 to close the leaf switch 410. When the reverse sensor 400 is closed, an input is sent to the control 96 indicating that the motor 55 should be stopped and reversed, and that the movement of the comb 43 should be stopped and reversed.

FIG. 23 is a flow chart illustrating a subroutine programmed into control 96 (FIG. 21) for a self-cleaning operation in the improved litter box 20. The flow chart starts with a command to comb litter 101 supplied to the control 96. As a consequence, a set direction and start command is supplied to the motor 55 in stage 102 of the subroutine. In the next stage 103, if the motor 55 is stalled, that condition is sensed and an output command is received by the motor 55 (stage 105) to reverse the direction of the motor 55. Ordinarily, however, the motor 55 will not be stalled and the next step (stage 104) is to determine whether the comb 43 is at its end of travel. If not, the subroutine returns to stage 103 and checks for a stalled motor 55. If the comb 43 is located at the discharge end of its travel, an output signal is applied to reverse the motor 55 (step 105).

When the motor 55 has been reversed, the condition of the motor 55 is again checked to see if it is stalled. If so, there is an output signal to stop the motor 55 (step 108). Ordinarily, however, the motor 55 will not be stalled and an enabling signal is received (stage 107) to check and see whether the comb 43 is in its "home" position. When comb 43 reaches its "home" position, at storage end of litter box 20) there is an output signal sent to stop the motor 55 (stage 108) which directs the subroutine to return to the beginning of the subroutine (stage 109). If the comb 43 has not reached the "home" position, the subroutine proceeds to stage 107A to determine if the reverse sensor 400 has been activated. If the reverse sensor 400 has not been activated, the subroutine returns to stage 106 and checks for a stalled motor 55. If the reverse sensor 400 has been activated, there is an output signal (stage 107A) to a stop motor (stage 108). The subroutine then returns to the beginning (stage 109). This completes the subroutine of FIG. 23.

Figure 24:
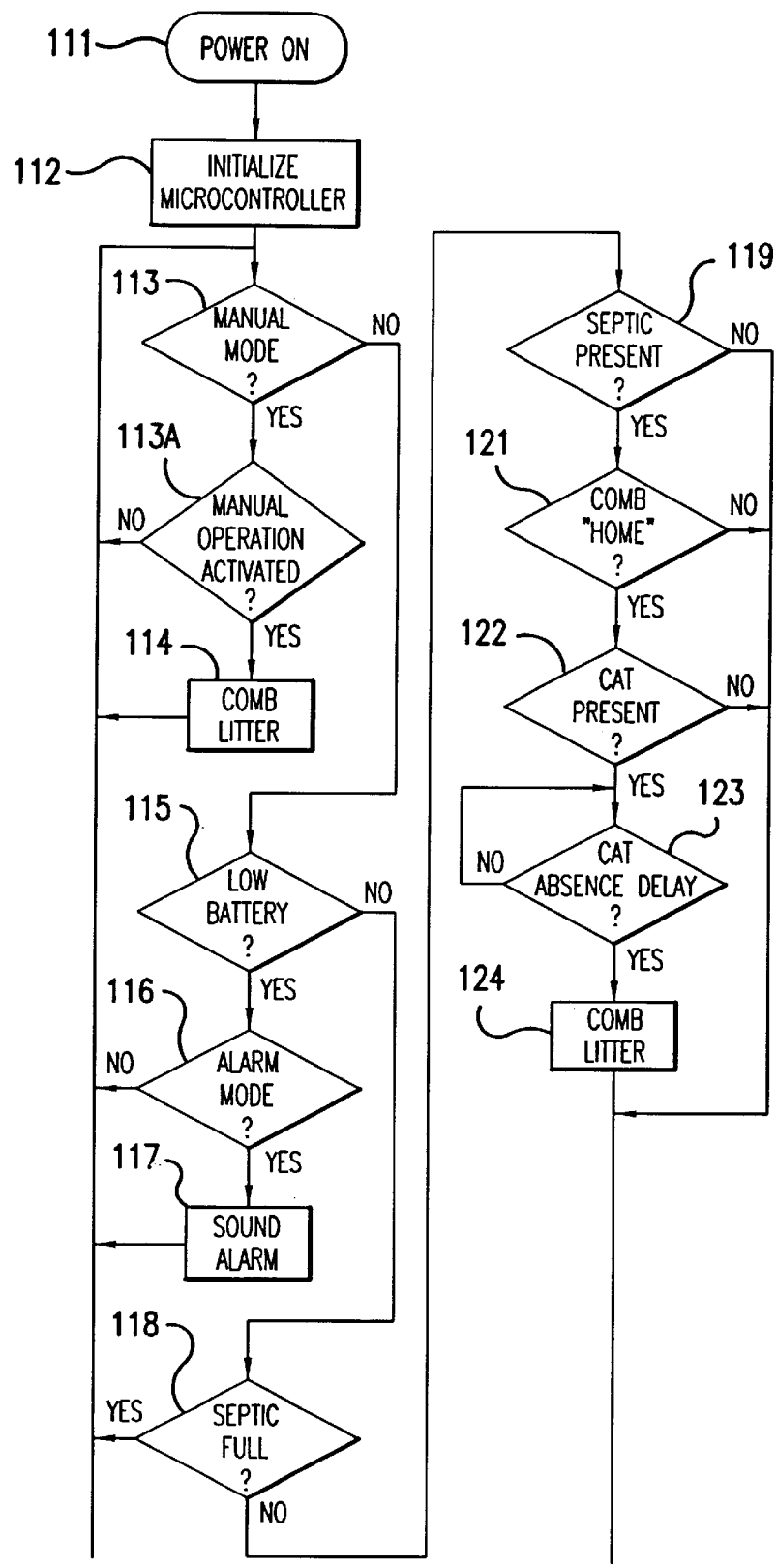
FIG. 24 is a flow chart illustrating optional modes of operation for the controls of the automated self-cleaning cat litter box of FIG. 5.
Figure 26:
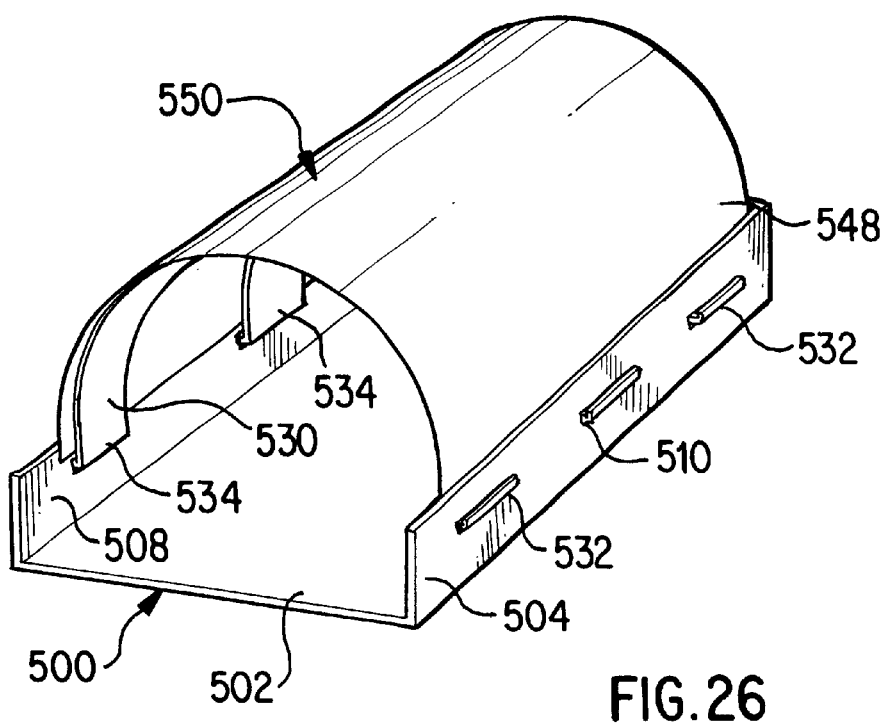
FIG. 26 illustrates the tray of FIG. 25 with a hood disposed over the hood supports.
Figure 25:
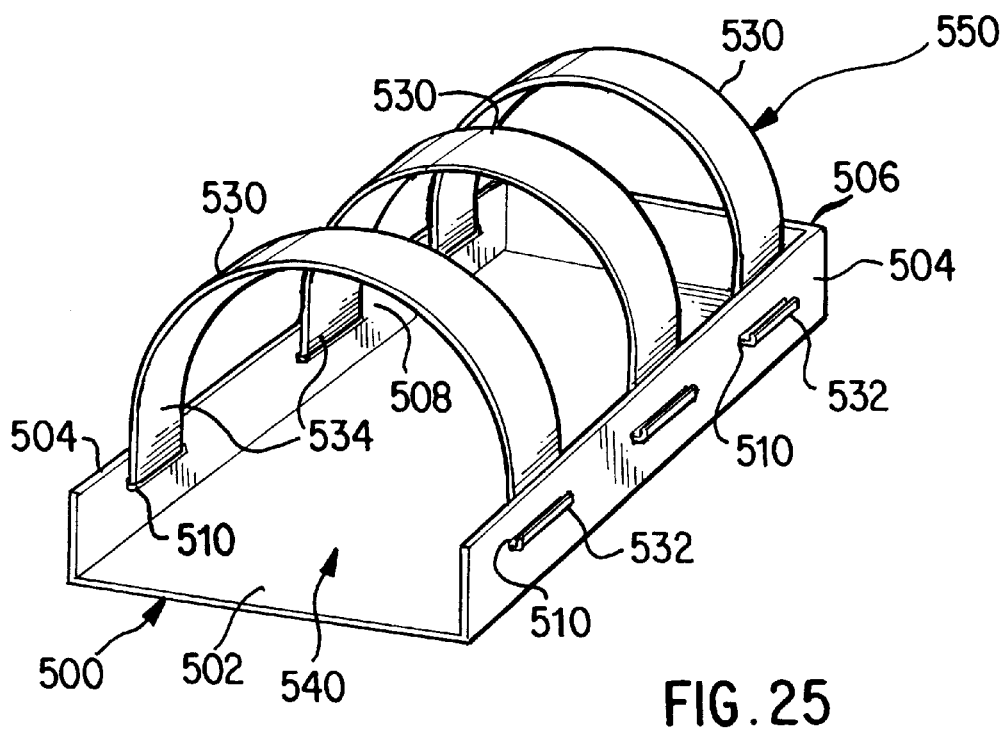
FIG. 25 is a perspective view illustrating a hood supporting structure, according to a preferred embodiment of the invention, including a tray and hood supports.
Figure 27:
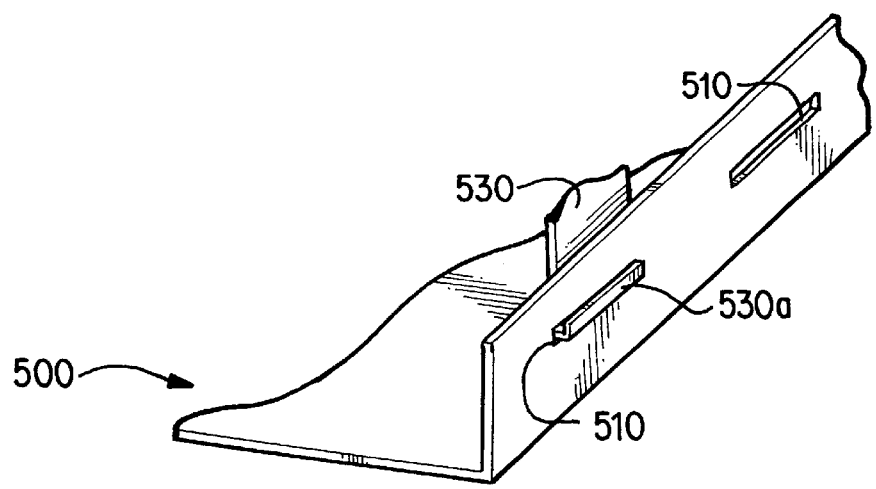
FIG. 27 illustrates an end portion of a hood support of FIG. 25 engaging an opening formed in a sidewall of the tray.
Figure 28:
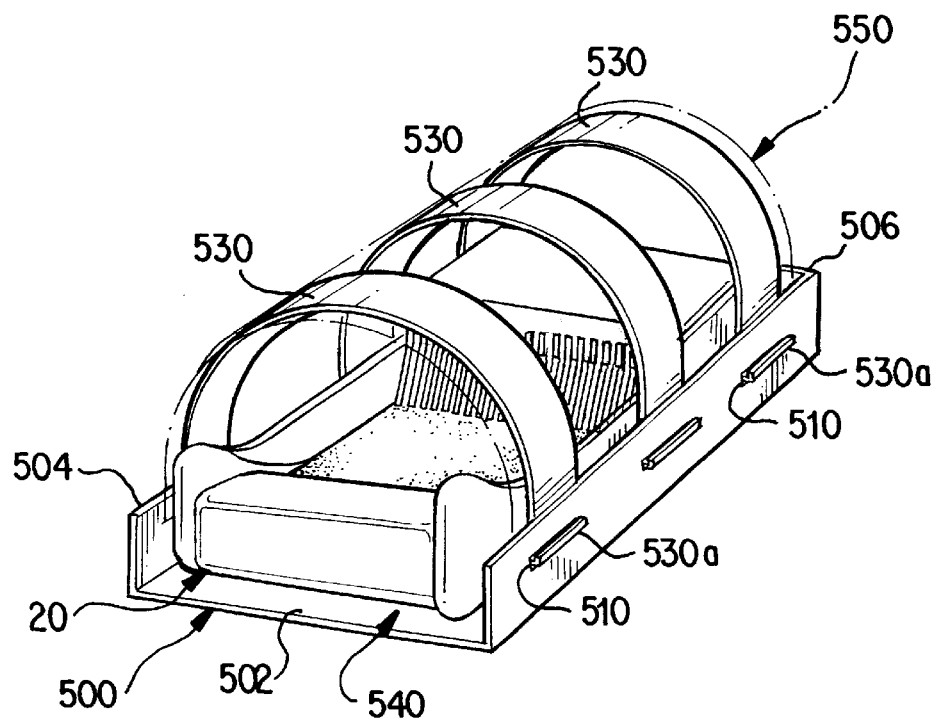
FIG. 28 illustrates a self-cleaning litter box disposed in the tray of FIG. 25.

FIG. 24 illustrates a further subroutine that is also programmed into processor control 96 (FIG. 21). The subroutine starts with a power-on stage 111 that may be initiated by an appropriate switch (for example, the mode select switch 91). Alternatively, the subroutine may start with insertion of appropriate batteries into battery case 55 (FIGS. 1–3) or by plugging in a conventional power supply 20 (not shown). The next stage 112 in the subroutine is initialization of the control 96. In the next subroutine stage 113, the control 96 checks to determine whether the mode select switch 91 of FIG. 21 is set for manual mode.

If the manual operation mode is selected, the control 96 checks to determine if a manual operation switch 370 (FIG. 22) has been activated (stage 113A). The manual operation switch 370 is normally open and provides a NO signal (stage 113A) when open. The manual operation switch 370 is activated by the cat owner. When the manual operation switch 370 has been activated, a comb litter procedure is initiated (stage 114). If the manual operation switch 370 has not been activated, the subroutine returns to the mode check at stage 113.

If the program is not set for manual mode, the subroutine checks for a low battery condition (stage 115). If a low battery voltage condition is ascertained, the subroutine checks to see if the alarm mode is set (stage 116) and, if the alarm mode is set, the subroutine actuates an alarm (stage 117) to produce a programmed output from buzzer 97 (FIG. 21) that alerts the user that a change of batteries is required. Outputs generated in stages 116 and 117 may be fed back to stage 113 in this subroutine in appropriate circumstances. If a conventional power supply is used to energize the motor 55, the control 96 may be programmed to skip stages 115 to 117. Ordinarily, however, when the voltages of the batteries are adequate, there is a NO output and the subroutine continues by checking for a full septic or waste receptacle 68 (stage 118). Ordinarily, the receptacle 68 will not be full. If the receptacle 68 is full, the subroutine returns to stage 113.

In normal circumstances, with adequate room in the receptacle 68, the subroutine checks to see if any septic is present (stage 119). If septic is present, the subroutine checks to determine if the comb 43 is in the "home" position (stage 121). If the comb 43 is in the home position, the subroutine checks for the presence of a cat in the litter box (stage 122). If the comb is not in the home position, or if the cat is not present in the litter box, the subroutine returns to the mode check (stage 113) and begins again. If the cat is present in the litter box, the subroutine waits for the delay time to expire (stage 123) and then executes a comb litter command (stage 124) and returns to the mode check (stage 113) and begins again.

Thus, the automated self-cleaning litter box 20 may be arranged so as not to frighten or disturb a cat; the self-cleaning movement of the comb 43 may not occur until there is a reasonable certainty that a cat using the litter box 20 has been gone for two to seven minutes, depending on the delay set into the control 96, before the motor 55 is energized. Other sensors can be used instead of photo detectors 82 and 94. For example, infra-red sensors receiving radiation from an appropriate infra-red source, or a strain gauge on pan bottom 26, may serve the same purpose as the photo detectors of FIGS. 1–4.

The gear drive 57 that connects motor 55 to shaft 41 is not subject to fouling by the litter, which often includes powdery material that is likely to interfere with operation of other drive mechanisms such as a worm drive. Motor 55 should be sealed against dust and dirt, since it must operate in an adverse environment. Litter box 20 is simple and economical in construction, but should afford an extended operating life with little or no attention apart from periodic replacement of the litter and replacement of the batteries 56.

In a preferred embodiment of the present invention, as shown in FIGS. 5 and 6, a durable ramp 350 is pivotally connected to the housing 21. The ramp 350 includes carpeting 352 and first and second pivot pins 354, 356 molded to one end of the ramp 350. The carpeting 352 is mounted upon a top side of the ramp 350. The carpeting 352 is ribbed and made of a fabric that will trap litter and provide suitable paw-cleaning and scratching-post functions for a cat utilizing the ramp 350. The ribbed carpet 352 traps litter. The carpet 352 may be easily removed for cleaning.

In order for the ramp 350 to be connected to the housing 21, the two side walls 22, 23 may include first and second pivot holes 360, 362 at the discharge end 28 of the litter box 20. The ramp 350 is attached to the housing 21 by placing the first pivot pin 354 and the second pivot pin 356 into pivot holes formed in the side walls 22, 23 of the litter box 20. The carpeting 352 is facing up as depicted in FIG. 6 and will minimize litter tracking when the cat exits the litter box 20.

Another feature of a preferred embodiment of the present invention, as shown in FIGS. 25–28, includes a rectangular tray 500 having first and second side walls 504, 508, an end wall 506 connected between the side walls 504, 508, and a bottom wall 502. The first and second side walls 504, 508, the end wall 506 and the bottom wall 502 cooperate to form a housing-receiving region 540. The tray 500 may be thermal formed or molded and is designed such that the housing 21 may be placed within the housing-receiving region 540. One aspect of the tray 500 is that it can be used as a catch-all if any litter or waste is kicked out of the self-cleaning litter box 20 by a cat.

Another aspect of the tray 500 is that it may be used to cooperate with a dome or hood 548 to define an enclosure 550 for the self-cleaning litter box 20. The dome 548 may be used to provide privacy for the cat. The enclosure 550 includes a plurality of hood supports 530. The hood supports 530, may be metal or plastic strips. Each hood support 530 has a first end portion 532 and a second end portion 534. To accommodate the hood supports 530, the first and second side walls 504, 508 have a plurality side of wall openings 510. The openings 510 are adapted to receive the hood support end portions 532, 534.

The hood supports 530 are placed into the side wall openings 510 such that the end portions 532, 534 are retained therein by the resiliency of the hood supports 530 acting against the side walls 504, 508. The hood 548 is placed over the hood supports 530 forming the enclosure 550. The hood 548 has an opening 552 and may be made of cloth or any suitable material and may be connected to the hood supports 530 in any manner. For example, the hood supports 530 may be sewn into the hood 548. Alternatively, the hood 548 may have ties that connect the hood 548 to the hood supports 530. Alternatively, the hood 548 can drape over the supports 530 and attach to the sidewalls 504, 508.

FIG. 29 illustrates the waste receptacle 68 and its lid 69 in the closed condition. There is a mass 271 of waste in receptacle 68, but the receptacle is not yet full. Receptacle 68 is positioned in the litter box 20 for engagement with bosses 222 and 223. The bosses 222 and 223 extend inwardly from the litter box side walls 22, 23, respectively, to engage the indentations 63, 70 (FIG. 6). The walls of the waste receptacle 68 adjacent side walls 22, 23 are provided with aligned openings 226, 227, respectively. Radiation from a source 242 on wall 22 impinges upon a detector 243 on wall 23 as long as the level of waste 271 in the receptacle 68 does not block the radiation.

While the invention has been described in detail in connection with preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

What is claimed as new and desired to be protected by Letters Patent of the United States is:

1. A cat litter apparatus, comprising:

a litter chamber;

an enclosure located over said litter chamber, said litter chamber being removable from said enclosure;

a removable litter tray disposed in the litter chamber to receive the litter; and a tray lock for selectively retaining the tray in the litter chamber, said tray lock comprising a resilient locking tab on a selected one of said tray and said litter chamber and a locking projection on the other of said tray and said litter chamber, said tab being removably retained in said projection.

2. The apparatus of claim 1, wherein the tray lock is selectively moved between a locking position and an unlocking position, said tray lock interfering with the removable tray to retain the tray in the housing when the lock is in the locking position.

3. The apparatus of claim 1, further comprising:

a comb disposed in said litter chamber;

a comb drive coupled to said comb and including a drive motor; and a sensor coupled to said drive motor and positioned to detect contact with an obstruction while said comb moves between a storage position and a discharge position.

4. The apparatus of claim 3, wherein said sensor provides a shut-off signal to said comb drive in response to detection of the obstruction.

5. The apparatus of claim 4, wherein said sensor includes a switch electrically coupled to said drive motor, said switch being movable between an open position and a closed position, said switch providing the shut-off signal to said comb drive when in the closed position.

6. The apparatus of claim 5, wherein said sensor is a leaf switch.

7. A litter box, comprising:

a housing defining a litter chamber;

a removable tray for receiving cat litter, said tray being located in the litter chamber;

a comb movably disposed in the removable tray for raking the cat litter supported in the tray; and a lock for retaining the removable tray in the housing, the lock including a locking projection coupled to the housing and a resilient locking tab coupled to the removable tray, the locking tab selectively engaging the locking projection.

* * * * *

UNITED STATES PATENT AND TRADEMARK OFFICE
CERTIFICATE OF CORRECTION

PATENT NO. : 6,378,461 B1 Page 1 of 1
DATED : April 30, 2002
INVENTOR(S) : Arnold Thaler et al.

It is certified that error appears in the above-identified patent and that said Letters Patent is hereby corrected as shown below:

<u>Title page,</u>
Insert Item [62] as follows:

-- [62] This application is a divisional application of U.S. Application Serial No. 09/118,081 filed July 17, 1998, now U.S. Patent 6,082,302 dated July 4, 2000. --

<u>Column 1,</u>
Line 1, insert -- This application is a divisional application of U.S. Application Serial No. 09/118,081 filed July 17, 1998, now U.S. Patent 6,082,302 dated July 4, 2000. --

Signed and Sealed this

Sixth Day of April, 2004

JON W. DUDAS
*Acting Director of the United States Patent and Trademark Office*